United States Patent
Yeh

(10) Patent No.: US 8,572,350 B2
(45) Date of Patent: Oct. 29, 2013

(54) MEMORY MANAGEMENT, MEMORY CONTROL SYSTEM AND WRITING METHOD FOR MANAGING REWRITABLE SEMICONDUCTOR NON-VOLATILE MEMORY OF A MEMORY STORAGE SYSTEM

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 726 days.

(21) Appl. No.: 12/764,593

(22) Filed: Apr. 21, 2010

(65) Prior Publication Data

US 2011/0213912 A1 Sep. 1, 2011

(30) Foreign Application Priority Data

Mar. 1, 2010 (TW) .............................. 99105808 A

(51) Int. Cl.
*G06F 12/00* (2006.01)

(52) U.S. Cl.
USPC .... 711/202; 711/203; 711/173; 711/E12.016; 711/E12.058

(58) Field of Classification Search
USPC .......... 711/170, 173, 112, 114, E12.002, 203, 711/162, 165, E12.008, E12.058, E12.016
See application file for complete search history.

(56) References Cited

U.S. PATENT DOCUMENTS

| 7,653,777 B2 * | 1/2010 | Tan et al. ....................... 711/103 |
| 2004/0193781 A1 * | 9/2004 | Chung et al. .................. 711/103 |
| 2008/0082736 A1 * | 4/2008 | Chow et al. ................... 711/103 |
| 2009/0089486 A1 * | 4/2009 | Cheung et al. ................ 711/103 |
| 2009/0248965 A1 * | 10/2009 | Lee et al. ....................... 711/103 |
| 2010/0169540 A1 * | 7/2010 | Sinclair .......................... 711/103 |
| 2010/0169544 A1 * | 7/2010 | Eom et al. ..................... 711/103 |

FOREIGN PATENT DOCUMENTS

| CN | 101661432 | 3/2010 |
| CN | 102567257 A * | 7/2012 |

OTHER PUBLICATIONS

"First Office Action of China Counterpart Application", issued on Apr. 9, 2013, p1-p6, in which the listed reference was cited.

\* cited by examiner

*Primary Examiner* — Pierre-Michel Bataille
(74) *Attorney, Agent, or Firm* — J.C. Patents

(57) ABSTRACT

A memory management and writing method for managing a memory module is provided. The memory module has a plurality of memory units and a plurality of data input/output buses corresponding to the memory units. The method includes configuring a plurality of logical units, dividing each of the logical units as a plurality of logical parts, and mapping the logical parts of each of the logical units to physical blocks of the memory units. The method also includes respectively establishing mapping tables corresponding to the data input/output buses, and only using one of the data input/output buses to write data from a host system into the corresponding memory unit according to the mapping table corresponding to the data input/output bus. Accordingly, the method can effectively increase the speed of writing data into the memory module.

30 Claims, 16 Drawing Sheets

| Logical unit | Physical block |
|---|---|
| 510(0) | 304(0) |
| 510(1) | 304(1) |
| ⋮ | ⋮ |
| 510(H) | 304(D) |

| Logical unit | Physical block |
|---|---|
| 510(0) | 314(0) |
| 510(1) | 314(1) |
| ⋮ | ⋮ |
| 510(H) | 314(D) |

| Logical unit | Physical block |
|---|---|
| 510(0) | 304(D+1) |
| 510(1) | 304(1) |
| 510(2) | 304(2) |
| ⋮ | ⋮ |
| 510(H) | 304(D) |

| Logical unit | Physical block |
|---|---|
| 510(0) | 314(0) |
| 510(1) | 314(D+1) |
| 510(2) | 314(2) |
| ⋮ | ⋮ |
| 510(H) | 314(D) |

MEMORY MANAGEMENT, MEMORY CONTROL SYSTEM AND WRITING METHOD FOR MANAGING REWRITABLE SEMICONDUCTOR NON-VOLATILE MEMORY OF A MEMORY STORAGE SYSTEM

CROSS-REFERENCE TO RELATED APPLICATION

This application claims the priority benefit of Taiwan application serial no. 99105808, filed on Mar. 1, 2010. The entirety of the above-mentioned patent application is hereby incorporated by reference herein and made a part of specification.

BACKGROUND OF THE INVENTION

1. Technology Field

The present invention relates to a memory management and writing method and particularly to a memory management and writing method for managing rewritable non-volatile memory, and a memory controller and a memory storage system using the same.

2. Description of Related Art

Digital cameras, cells phones, and digital music players have undergone rapid growth in recent years, so that consumer demand for storage media have also rapid increased. Rewritable non-volatile memory is one of the most adaptable memories for such battery-powered portable products due to its characteristics such as data non-volatility, low power consumption, small volume, and non-mechanical structure. A solid state drive (SSD) is a storage apparatus adopting rewritable non-volatile memory as storage medium. Rewritable non-volatile memory has been broadly used for storing important personal data thanks to its small volume and large capacity. Therefore, the rewritable non-volatile memory industry has become a very important part of the electronic industry in recent years.

Taking a storage device adopting a flash memory module as storage medium as an example, the memory unit of the flash memory module has a plurality of physical blocks, and each physical block has a plurality of physical pages, wherein data must be written into a physical block according to the sequence of the physical pages in the physical block. Additionally, a physical page stored data thereon has to be erased before being written in again. In particular, a smallest unit for erasing data is one physical block, and a smallest unit for programming (also referred to writing) data is one physical page. Therefore, in the management of the flash memory module, the physical blocks are grouped into a data area and a spare area. The physical blocks of the data area are used for storing data written by the host system. And, the physical blocks of the spare area are used for substituting the physical blocks of the data area. Hence, the physical blocks in the spare area are either blank or available blocks (i.e., no data is recorded in these blocks or data recorded in these blocks is marked as invalid data). In other words, the physical blocks in the data area and the spare area are alternatively used to store data written into the storage apparatus by the host system. For example, when the host system is about to store data in the storage apparatus, the memory management circuit of the storage apparatus identifies a physical block to be updated and gets a physical block from the spare area to substitute the physical block to be updated for writing data. To be specific, the memory management circuit of the storage apparatus copies valid data from the physical block to be updated to the gotten physical block, writes data to be written into the gotten physical block and associates the gotten physical block with the data area. Additionally, an erasing operation is performed to the physical block to be updated and the erased physical block is associated with the spare area.

In particular, in a case where the flash memory module has a plurality of memory units and the memory units transmit data with individual data input/output buses, the physical blocks of the memory units are grouped into a plurality of physical units and managed in unit of each physical unit. To be specific, each of the physical unit is composed of one corresponding physical block of each memory unit. For example, in a case where the flash memory module has a first memory unit and a second memory unit, one corresponding physical block in the first memory unit and one corresponding physical block in the second memory unit are grouped fixedly into one physical unit. And, in the operation of grouping the physical blocks into the data area and spare area and the writing operation, the memory management circuit operates the physical blocks in unit of each physical unit, thereby reducing resources needed for managing the memory module. Additionally, the speed for writing data can effectively be increased by simultaneously writing data into several physical blocks in one physical unit through several data input/output buses.

With the progress of semiconductor technology, the capacity of each physical page in the physical blocks becomes larger. However, in a case where a SSD is served as a main hard disk of a host system, because the length of sequential data written by the host system is smaller than the capacity of one physical page, the memory management circuit needs to spend more time to execute the above-mentioned operation of copying valid data, thereby influencing the performance of the storage apparatus.

Additionally, the number of times of writing data into one physical block (referred to the writing count of the physical block thereafter) is limited. However, in the above-mentioned management framework operating in unit of each physical unit, when the host system only writes data into one of physical blocks in a physical unit, the memory management circuit still needs to execute the erasing operation in unit of the physical unit. Accordingly, the writing count of physical blocks will be increased fast due to the operation of copying valid data, thereby shortening the lifespan of the storage apparatus.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a memory management and writing method capable of shortening the time for executing a write command and prolonging the lifespan of a memory module.

The present invention is directed to a memory controller capable of shortening the time for executing a write command and prolonging the lifespan of a memory module.

The present invention is directed to a memory storage system capable of shortening the time for executing a write command and prolonging the lifespan of a memory module.

According to an exemplary embodiment of the present invention, a memory management and writing method for managing a memory module is provided. The memory module has a first memory unit, a first data input/output bus for the first memory unit, a second memory unit and a second data input/output bus for the second memory unit, wherein the first memory unit and the second memory unit have a plurality of physical blocks. The memory management and writing method includes configuring a plurality of logical unit and dividing each of the logical units into a first logical part corresponding to the first data input/output bus and a second logical part corresponding to the second data input/output bus. The memory management and writing method also includes mapping the logical units to at least a portion of the physical blocks of the first memory unit and the second memory unit, wherein the first logical part of each logical unit maps to one of the physical blocks of the first memory unit and the second logical part of each logical unit maps to one of the physical blocks of the second memory unit. The memory management and writing method still includes establishing a first mapping table corresponding to the first input/output bus to record a first mapping relationship between the first logical parts and the physical blocks of the first memory unit, and establishing a second mapping table corresponding to the second input/output bus to record a second mapping relationship between the second logical parts and the physical blocks of the second memory unit. The memory management and writing method also includes receiving a write command and data corresponding to the write command, wherein the data is written into one of the first logical parts. The memory management and writing method further includes only using the first input/output bus to write the data corresponding to the write command into the first memory unit according to the first mapping table.

According to an exemplary embodiment of the present invention, a memory controller including a memory interface, a memory management circuit and a host interface is provided. The memory interface is coupled to the memory management circuit and configured to couple to the above-mentioned memory module. The host interface is coupled to the memory management circuit and configured for coupling to a host system. The memory management circuit is configured to execute the above-mentioned memory management and writing method.

According to an exemplary embodiment of the present invention, a memory storage system including a connector, the above-mentioned memory module and a memory controller coupling to the memory module is provided. The memory controller is configured to execute the above-mentioned memory management and writing method.

Based on the above, the memory management and writing method according to the exemplary embodiment of the present invention is capable of shortening the time for copying valid data and prolonging the lifespan of a memory module.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 6 and 7 are diagrams illustrating an example of logical unit-physical block mapping tables corresponding to data input/output buses according to the first exemplary embodiment of the present invention.

FIGS. 11A and 11B are diagrams illustrating another example of logical unit-physical block mapping tables corresponding to data input/output buses according to the first exemplary embodiment of the present invention.

DESCRIPTION OF THE EMBODIMENTS

Figure 1A:
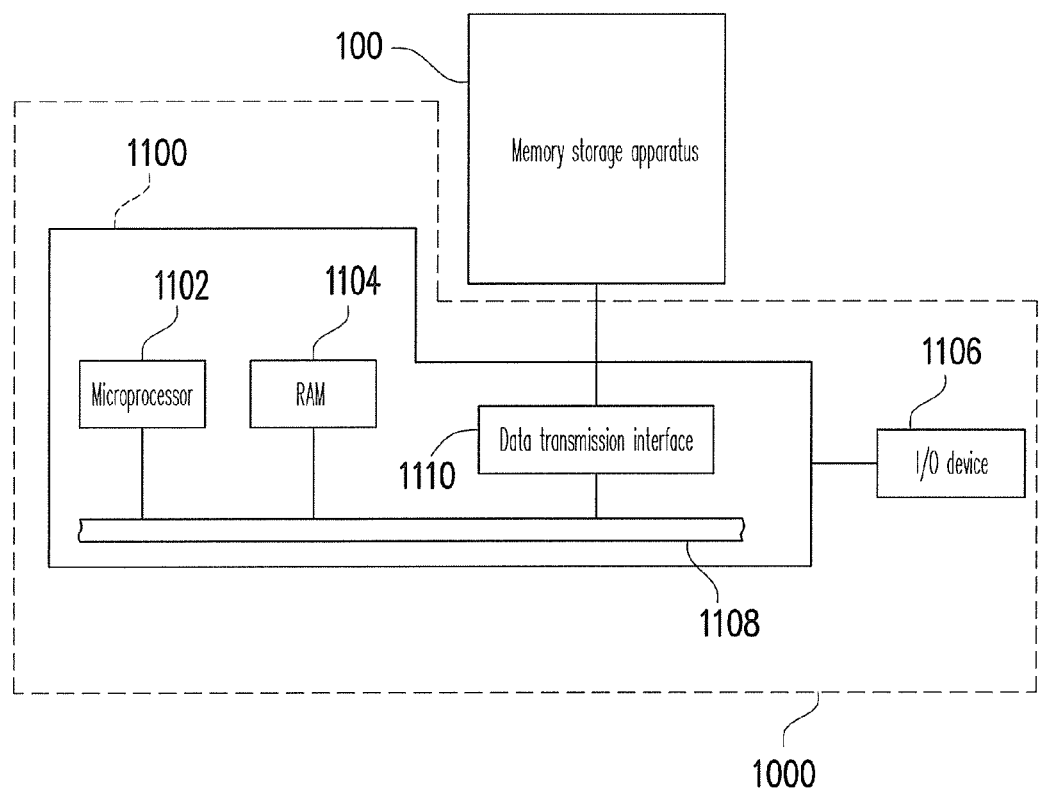
FIG. 1A is a schematic block diagram of a host system using a memory storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage apparatus (i.e., a memory storage system), typically, includes a memory module and a controller (i.e., a control circuit). The memory storage apparatus is usually used together with a host system so that the host system can write data into or read data from the memory storage apparatus. In addition, another kind of a memory storage apparatus is composed of an embedded memory and a software that can be executed by a host system and substantially served as a controller of the embedded memory.

[First Exemplary Embodiment]

FIG. 1A is a schematic block diagram of a host system using a memory storage apparatus according to the first exemplary embodiment of the present invention.

Figure 1B:
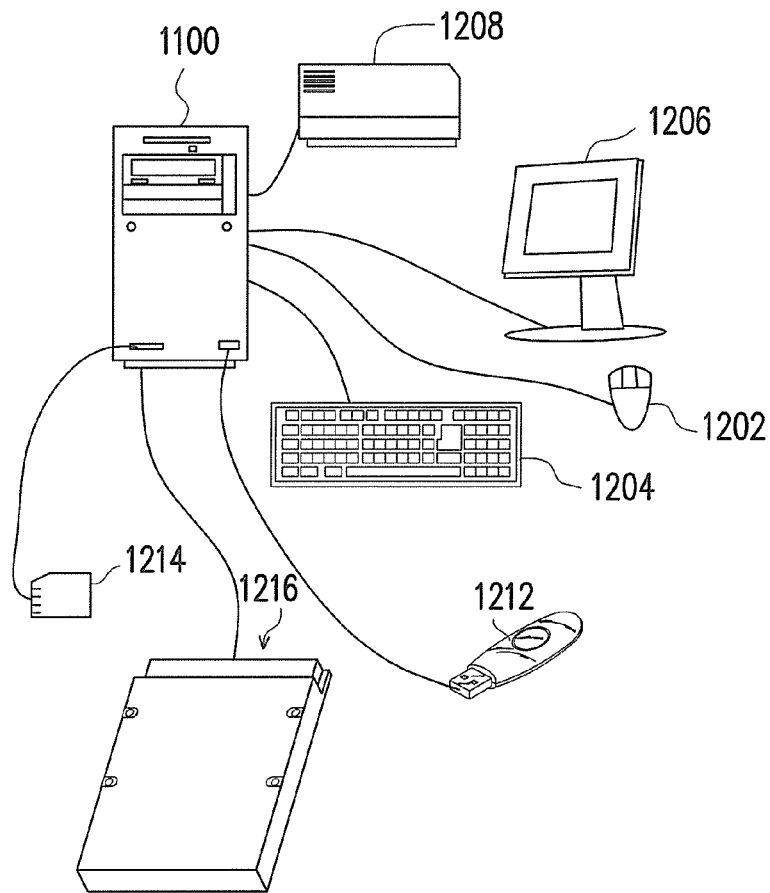
FIG. 1B is a diagram illustrating a computer, an input/output (I/O) device, and a memory storage apparatus according to an exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 as shown in FIG. 1B. It should be noted that the device in FIG. 1B does not limit the I/O device 1106; the I/O device 1106 may include other devices.

In the exemplary embodiment of the present invention, the memory storage apparatus 100 is coupled to the devices of the host system 1000 through the data transmission interface 1110. By using the microprocessor 1102, the random access memory (RAM) 1104 and the Input/Output (I/O) device 1106, the data can be write into the memory storage apparatus 100 or can be read from the memory storage apparatus 100. For example, the memory storage apparatus 100 may be a flash drive 1212, a memory card 1214, or a solid state drive (SSD) 1216, as shown in FIG. 1B.

Figure 1C:
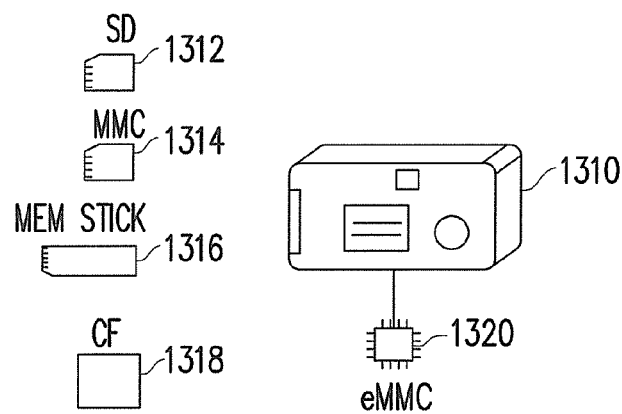
FIG. 1C is a diagram of a host system and a memory storage apparatus according to another exemplary embodiment of the present invention.

Generally, the host system 1000 substantially can be any system capable of storing data. Even though the host system 1000 is described as a computer system in the exemplary embodiment, in another exemplary embodiment of the present invention, the host system 1000 may also be a digital camera, a video camera, a communication device, an audio player, or a video player, and etc. For example, if the host system is a digital camera (video camera) 1310, the memory storage device is then a SD card 1312, a MMC card 1314, a memory stick 1316, a CF card 1318 or an embedded storage device 1320 (as shown in FIG. 1C). The embedded storage device 1320 includes an embedded MMC (eMMC). It should be noted that the eMMC is directly coupled to the substrate of the host system.

Figure 2:
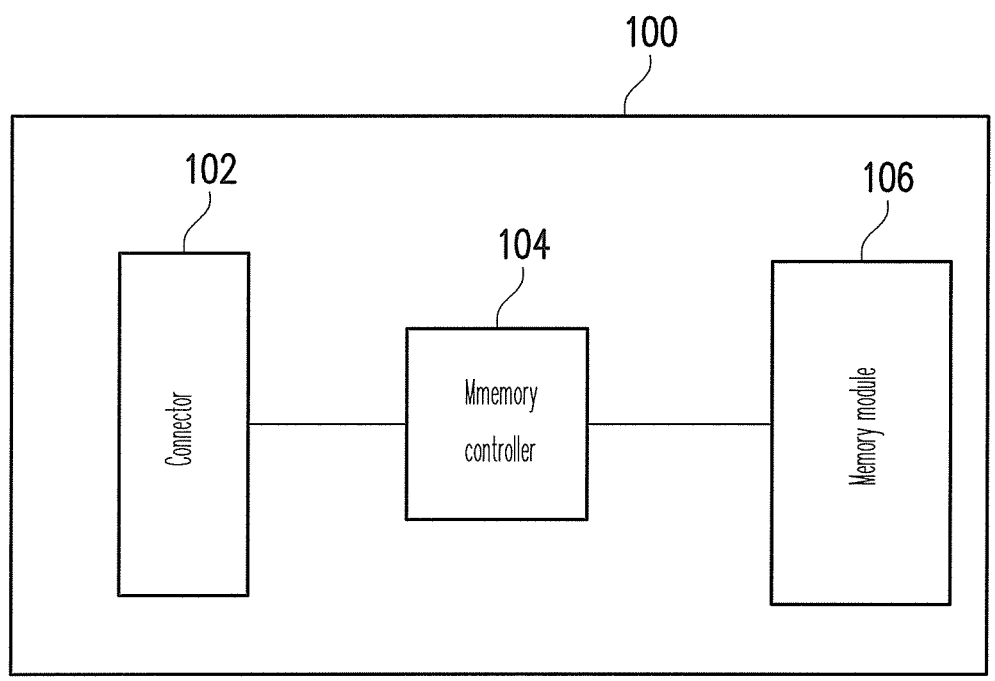
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a memory module 106.

In the present exemplary embodiment, the connector 102 is a serial advanced technology attachment (SATA) connector. However, it should be noticed that the present invention is not limited to the aforementioned description and the connector 102 also can be a universal serial bus (USB) connector, an institute-of-electrical-and-electronic-engineers (IEEE) 1394 connector, a peripheral-component Interconnect-express (PCI Express) connector, a secure digital (SD) interface connector, a memory stick (MS) interface connector, a multi-media-card (MMC) interface connector, a compact flash (CF) interface connector, an integrated-device-electronics (IDE) connector or other suitable type of connectors.

The memory controller 104 executes a plurality of logic gates or control instructions implemented in a hardware form or a firmware form and performs various data operations such as data writing, reading, and erasing in the memory module 106 according to commands of the host system 1000. In particular, the memory controller 104 executes a data access mechanism and a memory management mechanism according to the present exemplary embodiment.

The memory module 106 is coupled to the memory controller 104 and is configured to store data written by the host system 1000. Herein, the memory module 106 is a rewritable non-volatile memory module. For example, the memory module 106 is a multi-level cell (MLC) NAND flash memory module. However, the present invention is not limited thereto, and the memory module 106 may also be a single level cell (SLC) NAND flash memory module, other flash memory module or other memory module having the same characteristic.

Figure 3:
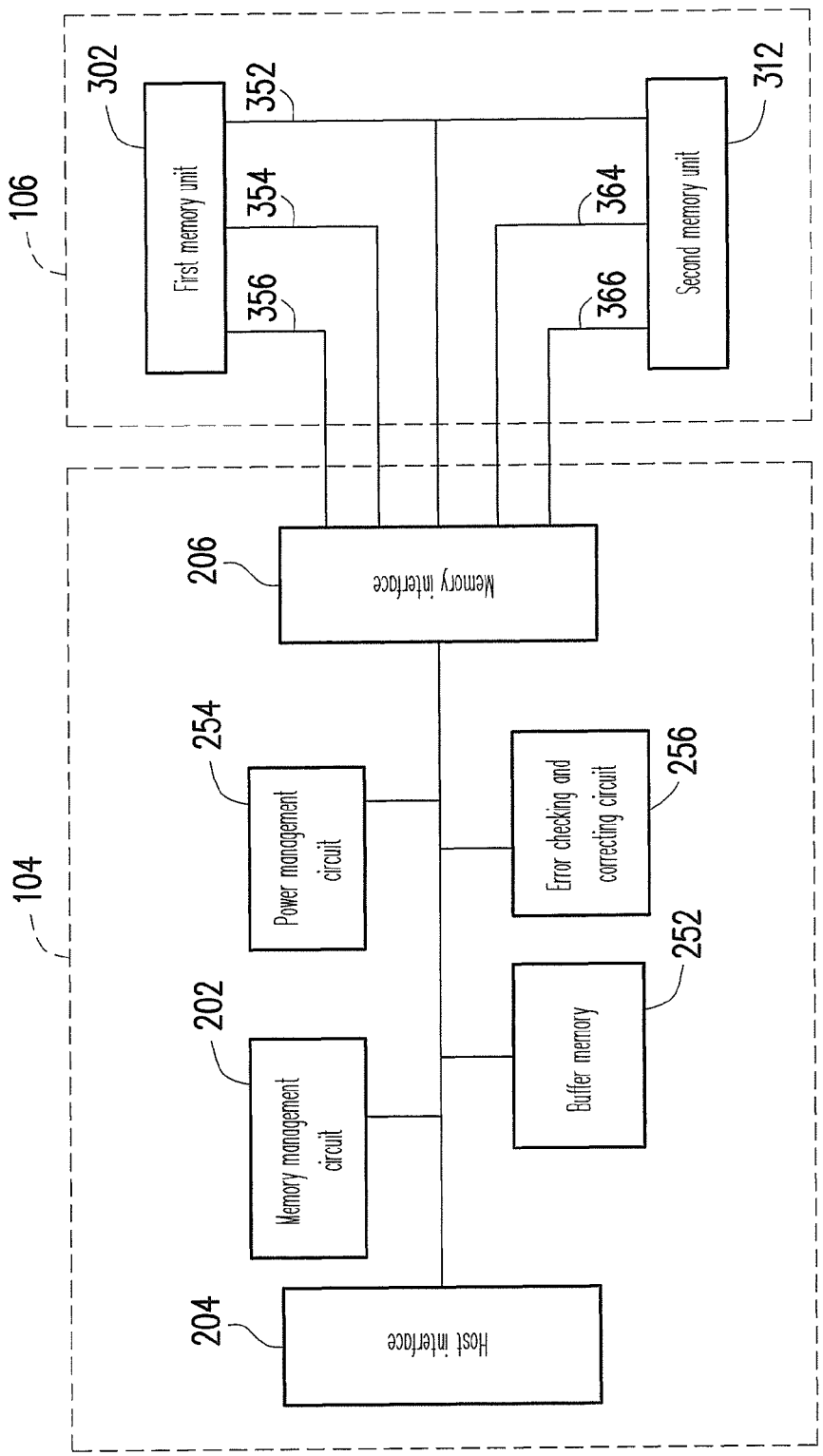
FIG. 3 is a schematic block diagram of a memory controller and a memory module according to the first exemplary embodiment of the present invention.

FIG. 3 is a schematic block diagram of a memory controller and a memory module according to the first exemplary embodiment of the present invention.

Referring to FIG. 3, the memory controller 104 includes a memory management circuit 202, a host interface 204 and a memory interface 206.

The memory management circuit 202 is configured for controlling the whole operation of the memory controller 104. To be specific, the memory management circuit 202 has a plurality of control instructions, and the control instructions are executed to manage the memory module 106 according to the data access mechanism and the memory management mechanism of the present exemplary embodiment during the memory storage apparatus 100 is operated. The data access mechanism and the memory management mechanism will be described with drawings as follows.

In the present embodiment, the control instructions of the memory management circuit 202 are implemented in a firmware form. For example, the memory management circuit 202 has a micro-processor unit (not shown) and a read-only memory (not shown), and the control instructions are burned in the read-only memory. When the memory storage apparatus 100 is operated, the control instructions are executed by the micro-processor unit to accomplish the data access mechanism and the memory management mechanism according to the present exemplary embodiment.

In another exemplary embodiment of the invention, the control instructions of the memory management circuit 202 are stored in a specific area (for example, the system area of the memory module exclusively used for storing system data) of the memory module 106 as program codes. Additionally, the memory management circuit 202 may have a micro-processor unit (not shown), a read-only memory (not shown) and a random access memory (not shown). And, the read-only memory has a driver code, and when the memory controller 104 is enabled, the micro-processor unit executes the driver code to load the control instructions of the memory management circuit 202 stored in the memory module 106 into the random access memory of the memory management circuit 202, and then accomplish the data access mechanism and the memory management mechanism according to the exemplary embodiment based on the control instructions. Additionally, the control instructions of the memory management circuit 202 are implemented in a hardware form.

The host interface 204 is coupled to the memory management circuit 202, and configured for receiving and identifying commands and data from the host system 1000. Namely, the commands and data from the host system 1000 are transmitted to the memory management circuit 202 through the host interface 204. In the present exemplary embodiment, the host interface 204 is a SATA interface corresponding to the connector 102. However, it should be understood that the invention is not limited thereto, and the host interface 204 may be a PATA interface, a USB interface, an IEEE 1394 interface, a PCI express interface, a SATA interface, a MS interface, a MMC interface, a CF interface, an IDE interface, or other suitable data transmission interfaces.

The memory interface 206 is coupled to the memory management circuit 202 and configured to couple to the memory module 106. Namely, data to be written into the memory module 106 is converted by the memory interface 206 into a format acceptable to the memory module 106.

In another exemplary embodiment of the present invention, the memory controller 104 still includes a buffer memory 252. The buffer memory 252 is coupled to the memory management circuit 202 and configured to temporarily store data and commands from the host system 1000 or data from the memory module 106.

In another exemplary embodiment of the present invention, the memory controller 104 still includes a power management circuit 254. The power management circuit 254 is coupled to the memory management circuit 202 and configured for controlling the power of the memory storage apparatus 100.

In another exemplary embodiment of the present invention, the memory controller 104 still includes an error checking and correcting circuit 256. The error checking and correcting circuit 256 is coupled to the memory management circuit 202, and configured for executing an error checking and correcting procedure to ensure data accuracy. To be specific, when the memory management circuit 202 receives a write command from the host system 1000, the error checking and correcting circuit 256 generates an error checking and correcting (ECC) code for the data corresponding to the write command, and the memory management circuit 202 writes the data and the corresponding ECC code into the memory module 106. Subsequently, when the memory management circuit 202 reads the data from the memory module 106, the memory management circuit 202 simultaneously reads the corresponding ECC code, and the error checking and correcting circuit 256 executes the ECC procedure for the read data based on the ECC code corresponding to the read data.

The memory module 106 includes a first memory unit 302 and a second memory unit 312. To be specific, the first memory unit 302 is coupled to the memory interface 206 via a chip enable pin 352, a first control bus 354 and a first data input/output bus 356. Additionally, the second memory unit 312 is coupled to the memory interface 206 via the chip enable pin 352, a second control bus 364 and a second data input/output bus 366. In the present exemplary embodiment, the control bus may include a read enable (RE) pin, a write enable (WE) pin, a command latch enable (CLE) pin, an address latch enable (ALE) pin, a write protect (WP) pin and a ready/busy output (R/B) pin. Additionally, it should be noted that even though the description of this exemplary embodiment is based on the example that the memory module 106 is composed of 2 memory units, but the present invention is not limited thereto. In another exemplary embodiment of the present invention, the number of the memory units disposed in the memory module 106 may be any number. Herein, it should be noted that the memory unit may be a memory chip and the memory chip has at least one memory die in the exemplary embodiment of the present invention.

The first memory unit 302 and the second memory unit 312 have a plurality of physical blocks, respectively. Each of the physical blocks has a plurality of physical pages and the physical pages belonging to the same physical block can be written individually and must be erased simultaneously. To be specific, each physical block is the smallest erasing unit. That is to say, each physical block contains the least number of memories that are erased together. Each physical block has several physical pages, and a smallest unit for programming data is one physical page. In other words, each physical page is the smallest unit for writing data or reading data. Each physical page usually includes a user data bit area and a redundant bit area. The user data bit area is used for storing user data, and the redundant bit area is used for storing system data (for example, the ECC code).

Figure 4:
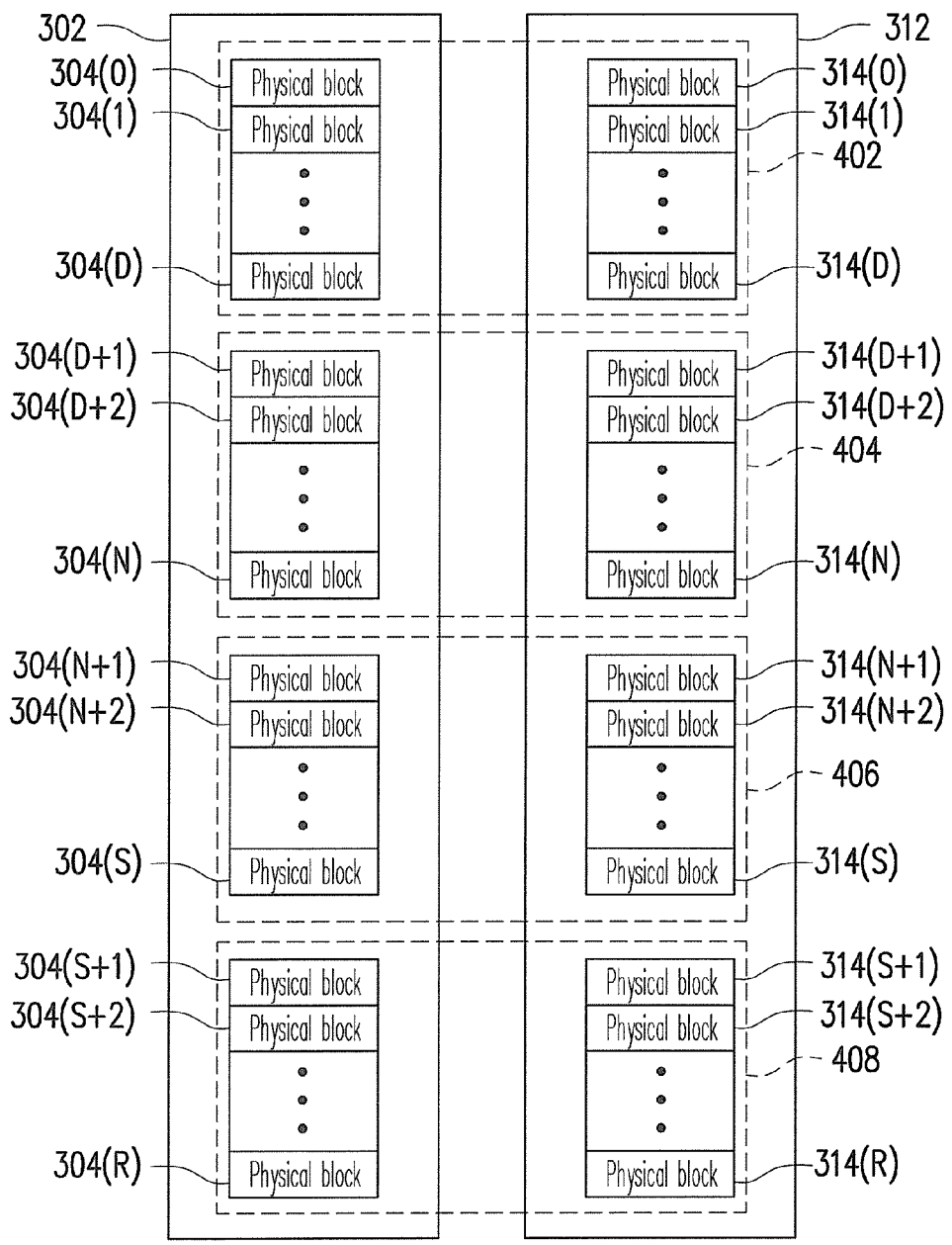
FIGS. 4 and 5 are exemplary diagrams of managing the memory module according to the first exemplary embodiment of the present invention.
Figure 5:
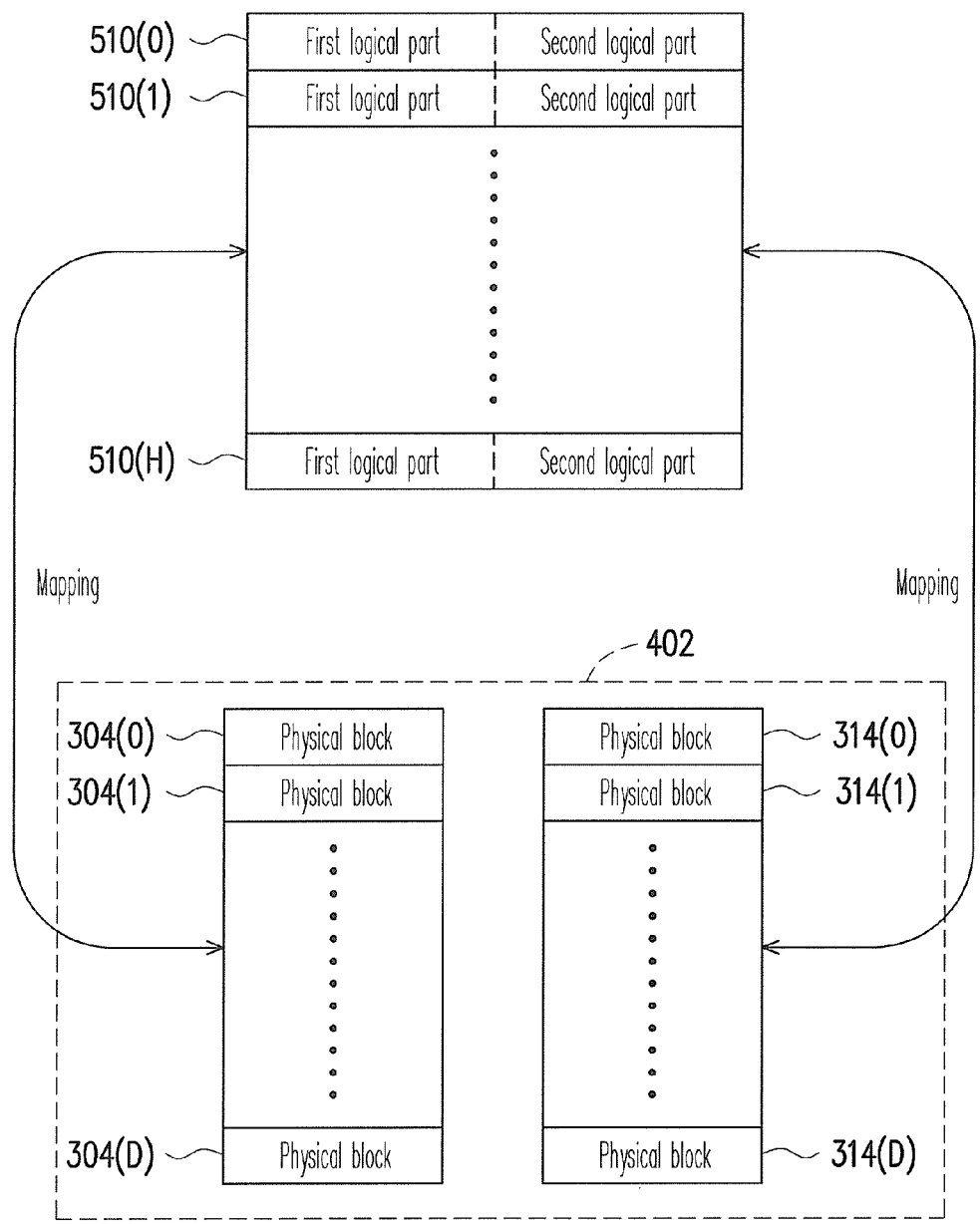

FIGS. 4 and 5 are exemplary diagrams of managing the memory module according to the first exemplary embodiment of the present invention.

It should be understood that the terms used herein for describing the operations (for example, "get", "select", "replace", "group", and "alternate", etc) performed on the physical blocks of the memory module 106 refer to logical operations performed on these physical blocks. Namely, the physical blocks in the memory module 106 are only logically operated and the actual positions thereof are not changed.

Referring to FIG. 4, the memory management circuit 202 logically groups the physical blocks 304(0)~304(R) of the first memory unit 302 and the physical blocks 314(0)~314(R) of the second memory unit 312 into a data area 402, a spare area 404, a system area 406 and a replacement area 408.

The physical blocks of the data area 402 and the spare area 404 are used for storing data from the host system 1000. To be specific, the physical blocks of the data area 402 are physical blocks which have been used for storing data, and the physical blocks of the spare area 404 are physical blocks which are used for substituting the physical blocks of the data area 402. Hence, the physical blocks of the spare area 404 are either blank or available blocks (i.e., no data is recorded in these blocks or data recorded in these blocks is marked as invalid data). That is, the physical blocks of the spare area 404 have been operated by an erasing operation, or when a physical block of the spare area 404 is gotten for storing data, the gotten physical block needs to be operated by the erasing operation first. Hence, the physical blocks of the spare area 404 are available physical blocks. It should be noted that in the present exemplary embodiment, the memory management circuit 202 manages the physical blocks based on the data input/output buses. Therefore, the physical blocks belonging to the first memory unit 302 in the spare area 404 are used only to substitute the physical blocks belonging to the first memory unit 302 in the data area 402, and the physical blocks belonging to the second memory unit 312 in the spare area 404 are used only to substitute the physical blocks belonging to the second memory unit 312 in the data area 402. In another exemplary embodiment, the physical blocks of the spare area 406 are used collectively for the first memory unit 302 and the second memory unit 312.

The physical blocks logically belonging to the system area 406 are used for recording system data, which includes information related to the manufacturer and a model of the memory unit, the number of the zones in each memory unit, the number of the physical blocks in each zone, the number of the physical pages in each physical block, and so forth.

The physical blocks logically belonging to the replacement area 408 are replacement physical blocks. For example, when the memory module 106 or the memory unit is manufactured in the factory, 4% of the physical blocks thereof are reserved for replacement. Namely, when any physical block in the data area 402, the spare area 404, and the system area 406 is damaged, a physical block in the replacement area 408 is used for replacing the damaged physical block (i.e., the bad block). Thus, if there are still normal physical blocks in the replacement area 408 and a physical block is damaged, the memory management circuit 202 gets a normal physical block from the replacement area 408 for replacing the damaged physical block. If there is no more normal physical block in the replacement area 408 and a physical block is damaged, the memory storage apparatus 100 is announced as being in a write-protect status and cannot be used for writing data anymore.

In particular, the numbers of the physical units in the data area 402, the spare area 404, the system area 406 and the replacement area 408 are various based on different memory modules. Additionally, it has to be understood that the grouping relationships of grouping the physical blocks into the data area 402, the spare area 404, the system area 406 and the replacement area 408 are dynamically changed during the operation of the memory storage apparatus 100. For example, when a physical block of the spare area 404 is damaged and replaced by a physical block of the replacement area 408, the physical block of the replacement area 408 is associated with the spare area 404.

Referring to FIG. 5, as described above, the physical blocks of the data area 402 and the spare area 404 are alternated to store data written by the host system 1000. In the present exemplary embodiment, the memory management circuit 202 configures logical access addresses to host system 1000 for properly accessing data in the physical blocks storing data with the above-mentioned alternate manner. In particular, the memory management circuit 202 groups the logical access addresses into logical units 510(0)~510(H) and divides each of the logical units 510(0)~510(H) into a first logical part corresponding to the first data input/output bus 356 and a second logical part corresponding to the second input/output bus 366. Namely, the logical access addresses are arranged according to the sequence of the data input/output buses. For example, in a case where each logical unit is composed of 8 logical access addresses (i.e., the logical unit 510(0) is composed of the logical access addresses 0~7, the logical unit 510(1) is composed of the logical access addresses 8~15 and so on), the first logical part corresponding to the first input/output bus 356 in the logical unit 510(0) is the logical access addresses 0~3, the second logical part corresponding to the second input/output bus 366 in the logical unit 510(0) is the logical access addresses 4~7, the first logical part corresponding to the first input/output bus 356 in the logical unit 510(1) is the logical access addresses 8~11, the second logical part corresponding to the second input/output bus 366 in the logical unit 510(1) is the logical access addresses 12~15, and so on.

Additionally, the memory management circuit 202 maps the first logical parts of the logical units to the physical blocks belonging to the first memory unit 302 in the data area 402, and maps the second logical parts of the logical units to the physical blocks belonging to the second memory unit 312 in the data area 402. For example, when the memory storage apparatus 100 is initiated (e.g., formatted), the first and second logical parts of the logical unit 510(0)~510(H) are mapped to the physical blocks of the data area 402, respectively. Namely, one logical unit maps one physical block of the first memory unit 302 and one physical block of the second memory unit 312. Herein, the memory management circuit 202 establishes a first logical part-physical block mapping table 602 for the first data input/output bus 356 (as shown in FIG. 6) and a second logical part-physical block mapping table 612 for the second data input/output bus 366 (as shown in FIG. 7) for recoding mapping relationships between the logical units and the physical blocks. Herein, the first logical part-physical block mapping table 602 is also referred to a first mapping table and the second logical part-physical block mapping table 612 is also referred to a second mapping table.

Figure 8:
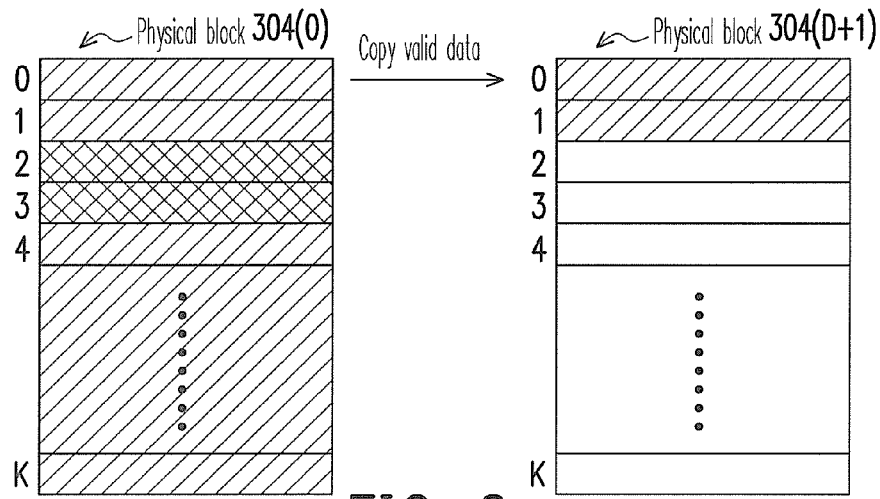
FIGS. 8~10 are exemplary diagrams of writing data into the memory module according to the first exemplary embodiment of the present invention.
Figure 9:
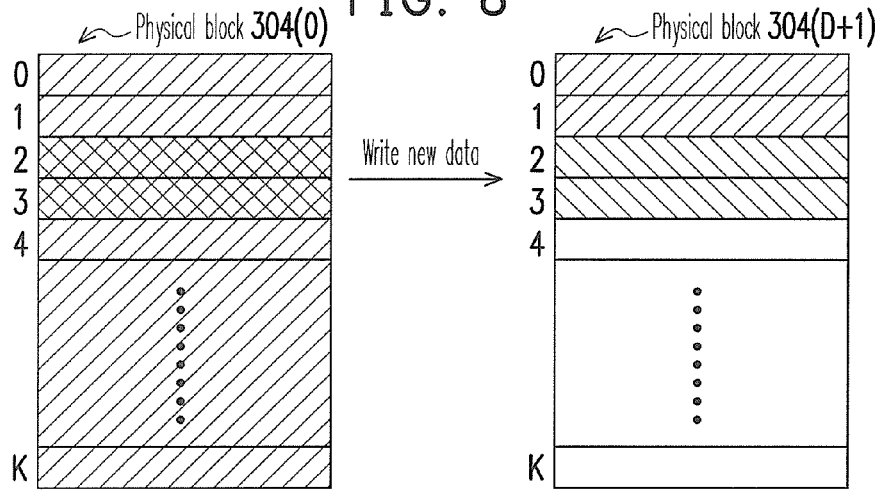
Figure 10:
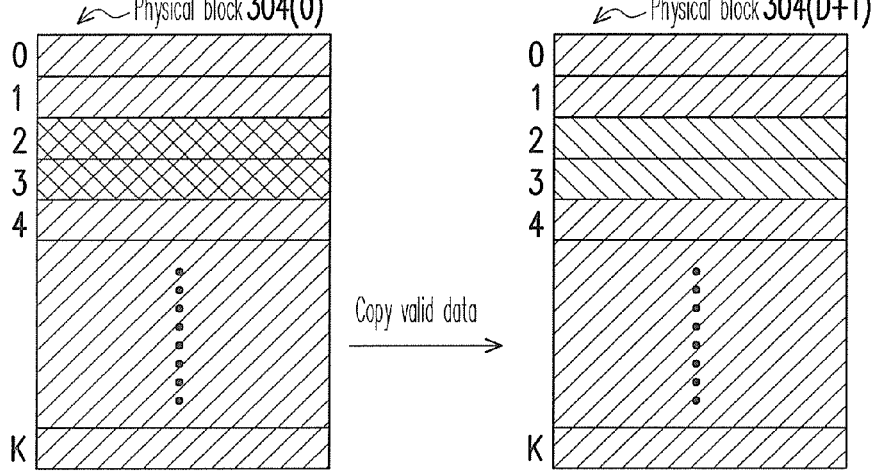

FIGS. 8~10 are exemplary diagrams of writing data into the memory module according to the first exemplary embodiment of the present invention.

Referring to FIGS. 8~10, for example, under the mapping status shown in FIGS. 6 and 7, when the memory controller 104 receives a write command from the host system 1000 for writing data into the logical access addresses belonging to the first logical part of the logical unit 510(0), the memory management circuit 202 identifies that the first logical part of the logical unit 510(0) currently maps to the physical block 304(0) based on the first logical part-physical block mapping table 602 and gets the physical block 304(D+1) belonging to the first memory unit 302 from the spare area 404 as a substitute physical block for substituting the physical block 304(0). However, the memory management circuit 202 does not instantly move all the valid data in the physical block 304(0) into the physical block 304(D+1) and erase the physical block 304(0) when writing the new data into the physical block 304(D+1). To be specific, the memory management circuit 202 copies the valid data before the physical page for writing the new data (i.e., the $0^{th}$ physical page and the $1^{st}$ physical page) in the physical block 304(0) to the physical block 304(D+1) (as shown in FIG. 8) and writes the new data into the $2^{nd}$ physical page and the $3^{rd}$ physical page of the physical block 304(D+1) (as shown in FIG. 9). At this time, the memory management circuit 202 completes the writing operation. Because the valid data in the physical block 304(0) may become invalid during a next operation (for example, next write command), instantly moving all the valid data in the physical block 304(0) to the physical block 304(D+1) may become meaningless. Additionally, because data must be written orderly into the physical pages of the physical blocks, the memory management circuit 202 moves valid data before the physical page to be written, first.

In the exemplary embodiment, the operation of temporarily keeping this temporary relationship (i.e., a relationship between the physical block 304(0) and the physical block 304(D+1)) is referred to as opening mother-child blocks, and the original physical block is referred as a "mother physical block" and the substitute physical block is referred as a "child physical block".

Thereafter, the memory management circuit 202 will integrate the physical block 304(0) and the physical block 304(D+1) into a single physical block when the contents of the two are to be actually combined, so that the efficiency of using physical blocks can be improved. Herein, the operation of integrating the physical blocks is also referred to as closing mother-child blocks. For example, as shown in FIG. 10, when closing the mother-child blocks, the memory management circuit 202 copies rest of the valid data (i.e., the $4^{th}$~$K^{th}$ physical addresses) of the physical block 304(0) to the substitute physical block 304(D+1), and then erases the physical block 304(0) and associates the physical block 304(0) with the spare area 404. Meanwhile, the physical unit 430(D+1) is associated with the data area 402. Namely, the memory management circuit 202 re-maps the logical unit 510(0) to the physical block 304 (D+1) in the first logical part-physical block mapping table 602 (as shown in FIG. 11A). Additionally, in the present exemplary embodiment, the memory management circuit 202 establishes a spare area physical block table (not shown) for recording the physical blocks currently associated with the spare area 404. It should be noted that when opening mother-child blocks, the memory management circuit 202 needs more storage spaces of the buffer memory 252 to store management variables for recoding detail storage statuses. For example, these management variables record which physical pages of the physical blocks 304(0) and 304 (D+1) are used to store valid data of the first logical part of the first logical unit 510(0). Accordingly, during the operation of the memory storage apparatus 100, the number of mother-child blocks is limited. Therefore, when the memory storage apparatus 100 receives a write command from the host system 1000 and the number of opened mother-child blocks reaches the maximum, the memory management circuit 202 must close one of the opened mother-child blocks, so as to execute the write command.

In the operation shown in FIGS. 8~10, the memory management circuit 202 only enables the first input/output bus 356 to transmit data and complete writing data and coping valid data for the physical blocks belong to the first memory unit 302. To be specific, in the present exemplary embodiment, the memory interface 206 is coupled to the first memory unit 302 and the second memory unit 312 via the same chip enable pin 352. When the memory management circuit 202 is about to give a write command to the first memory unit 302 and gives a chip enable command to enable the first memory unit 302 via the chip enable pin 352, the second memory unit 312 will be enabled simultaneously. At this time, the memory management circuit 202 only gives the write command via the first control bus 354 and transmits data via the first input/output bus 356. Because the second control bus 364 and the second input/output bus 366 are not enabled, the second memory unit 312 will not perform any operation though it has been enabled.

Similarly, under the mapping status shown in FIGS. 11A and 7, when the memory controller 104 receives a write command from the host system 1000 for writing data into the logical access addresses belonging to the second logical part of the logical unit 510(1), the memory management circuit 202 identifies that the second logical part of the logical unit 510(1) currently maps to the physical block 314(1) based on the second logical part-physical block mapping table 612 and gets the physical block 314(D+1) belonging to the second memory unit 312 from the spare area 404 as a substitute physical block for substituting the physical block 314(1). And, after the operation of closing mother-child blocks, the memory management circuit 202 re-maps the logical unit 510(1) to the physical block 314 (D+1) in the second logical part-physical block mapping table 612 (as shown in FIG. 11B). And, during the operation of executing the write command, the memory management circuit 202 only enables the second input/output bus 366 to transmit data and complete writing data and copying valid data for the physical blocks belonging to the second memory unit 312. Similarly, during the operation, the memory management circuit 202 gives a chip enable command to enable the second memory unit 312 via the chip enable pin 352, and the first memory unit 302 will be enabled simultaneously. At this time, the memory management circuit 202 only gives the write command via the second control bus 364 and transmits data via the second input/output bus 366. Because the first control bus 354 and the first input/output bus 356 are not enabled, the first memory unit 302 will not perform any operation though it has been enabled.

In particular, all logical part-physical block mapping tables are stored in the memory module 106 (e.g., the physical blocks of the system area), and when a memory unit is about to be accessed, a logical part-physical block mapping table corresponding to the memory unit just be loaded into the buffer memory 252 for reading and updating.

Though the memory management circuit 202 individually manages the memory units according to different data input/output buses, several data input/output buses may be operated simultaneously to enhance the performance of the memory storage apparatus 100.

For example, when the memory controller 104 receives a write command for the host system 1000 for writing data into the logical access address belonging to the first logical part of the logical unit 510(0), the memory management circuit 202 determines whether the operation of copying valid data (e.g., the operation of closing mother-child blocks) between the physical blocks of the first memory unit 302 is needed to execute first. In particular, when the operation of copying valid data between the physical blocks of the first memory unit 302 is needed to execute first, the memory management circuit 202 further determines whether the operation of copying valid data between the physical blocks of the second memory unit 312 is needed to execute. If the operation of copying valid data between the physical blocks of the second memory unit 312 is needed to execute, the memory management circuit 202 executes a synchronous operation for executing the operations of copying valid data simultaneously in the first memory unit 302 and the second memory unit 312.

To be specific, in the synchronous operation, first, the memory management circuit 202 simultaneously enables the first memory unit 302 and the second memory unit 312 via the chip enable pin 352. Then, the memory management circuit 202 gives a first control command to the first memory unit 302 via the first control bus 354 and gives a second control command to the second memory unit 312 via the second control bus 364, simultaneously. After that, the operations of copying valid data are executed in the first memory unit 302 and the second memory unit 312, simultaneously. For example, during the operations of copying valid data are executed, valid data belonging to the first memory unit 302 and valid data belonging to the second memory unit 312 are transmitted respectively to the buffer memory 252 via the first input/output bus 356 and the second input/output bus 366 and then written into the corresponding physical pages.

Figure 12:
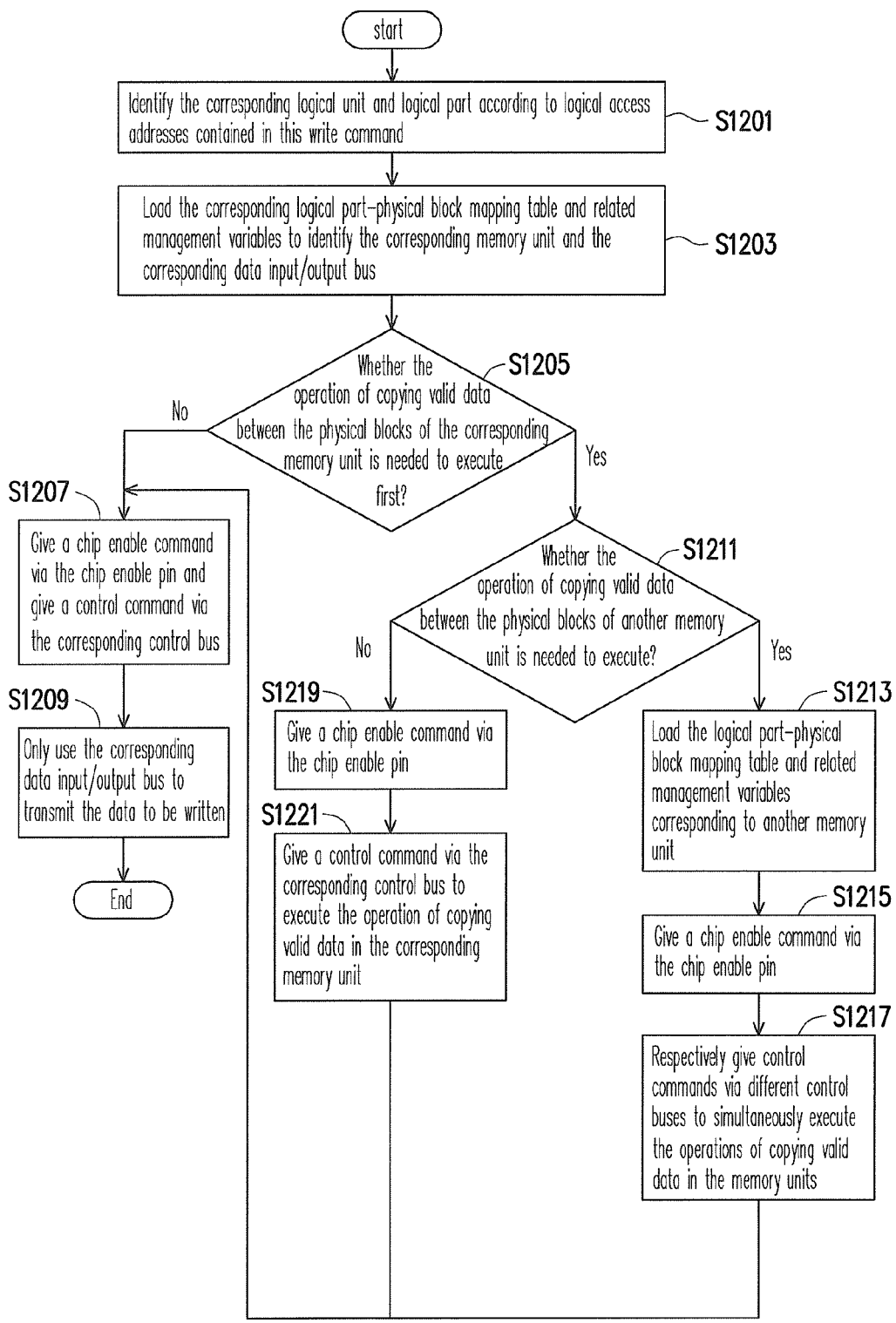
FIG. 12 is a flow chart illustrating a memory management and writing method according to the first exemplary embodiment of the present invention.

FIG. 12 is a flow chart illustrating a memory management and writing method according to the first exemplary embodiment of the present invention.

Referring to FIG. 12, when receiving a write command and data corresponding to the write command from the host system 1000, in step S1201, the memory management circuit 202 identifies the corresponding logical unit and logical part according to logical access addresses contained in this write command. And, in step S1203, the memory management circuit 202 loads the corresponding logical part-physical block mapping table and related management variables to identify the corresponding memory unit and the corresponding data input/output bus.

After that, in step S1205, the memory management circuit 202 determines whether the operation of copying valid data between the physical blocks of the corresponding memory unit is needed to execute first. If the operation of copying valid data between the physical blocks of the corresponding memory unit is not needed to execute first, in step S1207, the memory management circuit 202 gives a chip enable command via the chip enable pin (i.e., the chip enable pin 352) and gives a control command via the corresponding control bus. Then, in step S1209, the memory management circuit 202 only uses the corresponding data input/output bus to transmit the data to be written.

In particular, If in step S1203, it is determined that the operation of copying valid data between the physical blocks of the corresponding memory unit is needed to execute first, in step S1211, the memory management circuit 202 determines whether the operation of copying valid data between the physical blocks of another memory unit is needed to execute.

If the operation of copying valid data between the physical blocks of another memory unit is needed to execute, in step S1213, the memory management circuit 202 loads the logical part-physical block mapping table and related management variables corresponding to another memory unit. Then, in the step S1215, the memory management circuit 202 gives a chip enable command via the chip enable pin (i.e., the chip enable pin 352). After that, in step S1217, the memory management circuit 202 respectively gives control commands via different control buses to simultaneously execute the operations of copying valid data in the memory units (i.e., the first memory unit 302 and the second memory unit 312), and then the step S1207 is executed.

If the operation of copying valid data between the physical blocks of another memory unit is not needed to execute, in step S1219, the memory management circuit 202 gives a chip enable command via the chip enable pin (i.e., the chip enable pin 352). And, in step S1221, the memory management circuit 202 gives a control command via the corresponding control bus to execute the operation of copying valid data in the corresponding memory unit, and then the step S1207 is executed.

[Second Exemplary Embodiment]

A memory storage apparatus and a host system of the second exemplary embodiment substantially is the same as the memory storage apparatus and the host system of the first exemplary embodiment, and only the difference is described as the following.

Figure 13:
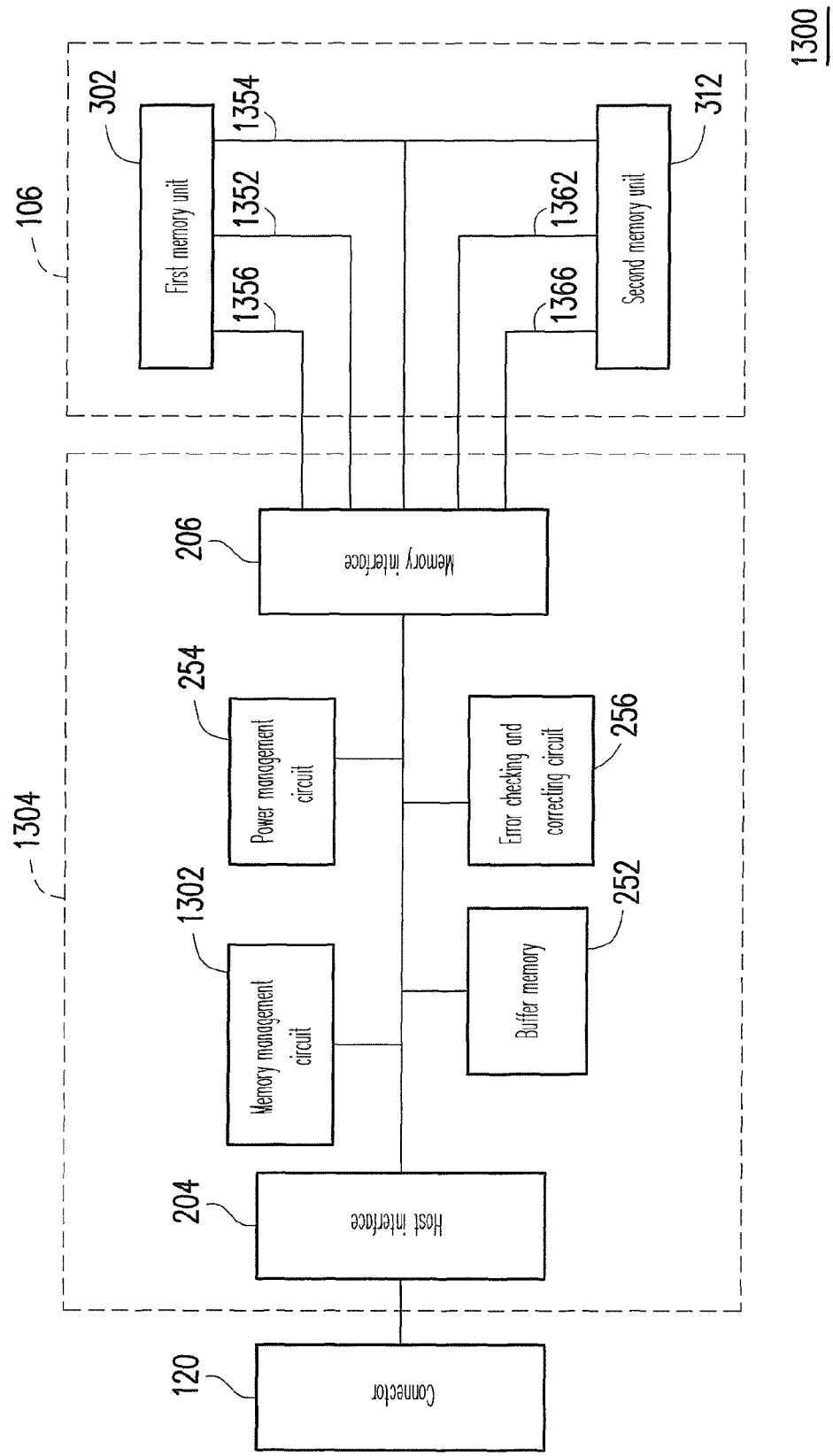
FIG. 13 is a schematic block diagram illustrating a memory storage apparatus according to a second exemplary embodiment of the present invention.

FIG. 13 is a schematic block diagram illustrating a memory storage apparatus according to the second exemplary embodiment of the present invention.

Referring to FIG. 13, the memory storage apparatus 1300 includes the connector 102, a memory controller 1304, and the memory module 106.

The memory controller 1304 executes a plurality of logic gates or control instructions implemented in a hardware form or a firmware form and performs various data operations such as data writing, reading, and erasing in the memory module 106 according to commands of the host system 1000. In particular, the memory controller 1304 executes a data access mechanism and a memory management mechanism according to the present exemplary embodiment.

The memory controller 1304 includes a memory management circuit 1302, the host interface 204, the memory interface 206, the buffer memory 252, the power management circuit 254 and the error checking and correcting circuit 256.

In the present exemplary embodiment, the first memory unit 302 of the memory module 106 is coupled to the memory interface 206 via a first chip enable pin 1352, a control bus 1354 and a first data input/output bus 1356. Additionally, the second memory unit 312 of the memory module 106 is coupled to the memory interface 206 via a second chip enable pin 1362, the control bus 1354 and a second data input/output bus 1366.

The memory management circuit 1302 is configured for controlling the whole operation of the memory controller 1304. To be specific, the memory management circuit 1302 has a plurality of control instructions, and the control instructions are executed to manage the memory module 106 according to the data access mechanism and the memory management mechanism of the present exemplary embodiment during the memory storage apparatus 1300 is operated.

In the present exemplary embodiment, the memory management circuit 1302 executes the operations shown in FIGS. 4~10, FIG. 11A and FIG. 11B to manage the memory module 106. However, because the coupling mechanism between the memory module 106 and the memory controller 1304 is different from that of the first exemplary embodiment, the memory management circuit 1302 gives commands in different manners to complete the operations shown in FIGS. 4~10, FIG. 11A and FIG. 11B.

For example, in the operation shown in FIGS. 8~10, the memory management circuit 1302 also only enables the first input/output bus 1356 to transmit data and complete writing data and copying valid data for the physical blocks belonging to the first memory unit 302. However, the memory management circuit 1302 first gives a first chip enable command to enable the first memory unit 302 via the first chip enable pin 1352. Then, the memory management circuit 1302 gives a control command via the control bus 1354. Herein, the memory interface 206 is coupled to the first memory unit 302 and the second memory unit 312 via the same control bus 1354, and therefore the given control bus is transmitted simultaneously to the first memory unit 302 and the second memory unit 312. However, because the second memory unit 312 is not enabled, the given control bus will not cause any operation in the second memory unit 312. At this time, the memory management circuit 1302 transmits data only via the first input/output bus 1356 to complete the write command for the physical blocks of the first memory unit 302.

Additionally, when the above-mentioned synchronous operation is executed, the memory management circuit 1302 first gives a first chip enable command via the first chip enable pin 1352 and gives a second chip enable command via the second chip enable pin 1362. Then, the memory management circuit 1302 gives the same control command to the first memory unit 302 and the second memory unit 312 via the control bus 1354. After that, the operations of copying valid data are executed in the first memory unit 302 and the second memory unit 312, simultaneously. For example, during the operations of copying valid data are executed, valid data belonging to the first memory unit 302 and valid data belonging to the second memory unit 312 are transmitted respectively to the buffer memory 252 via the first input/output bus 1356 and the second input/output bus 1366 and then written into the corresponding physical pages.

Figure 14:
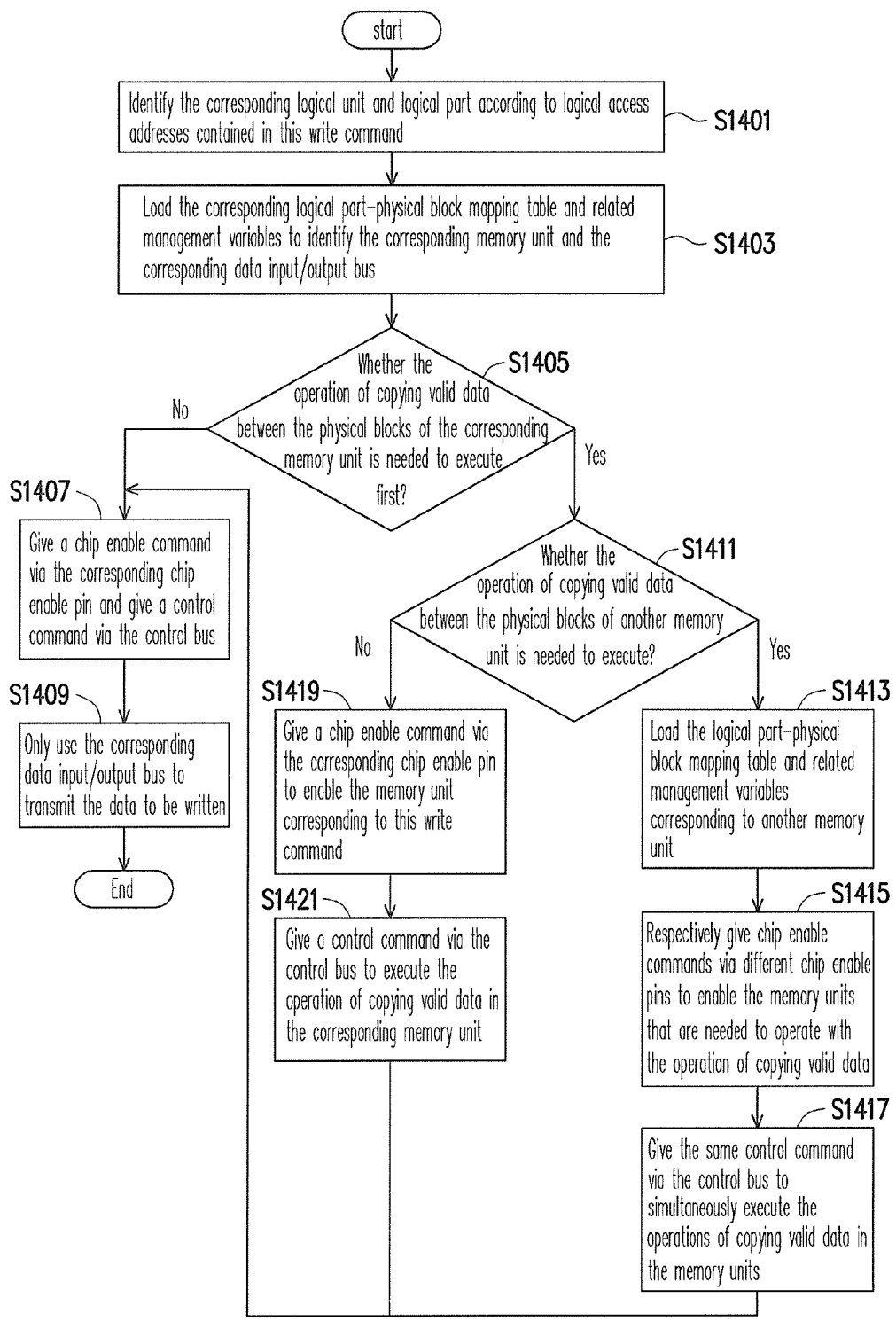
FIG. 14 is a flow chart illustrating a memory management and writing method according to the second exemplary embodiment of the present invention.

FIG. 14 is a flow chart illustrating a memory management and writing method according to the second exemplary embodiment of the present invention.

Referring to FIG. 14, when receiving a write command and data corresponding to the write command from the host system 1000, in step S1401, the memory management circuit 1302 identifies the corresponding logical unit and logical part according to logical access addresses contained in this write command. And, in step S1403, the memory management circuit 1302 loads the corresponding logical part-physical block mapping table and related management variables to identify the corresponding memory unit and the corresponding data input/output bus.

After that, in step S1405, the memory management circuit 1302 determines whether the operation of copying valid data between the physical blocks of the corresponding memory unit is needed to execute first. If the operation of copying valid data between the physical blocks of the corresponding memory unit is not needed to execute first, in step S1407, the memory management circuit 1302 gives a chip enable command via the corresponding chip enable pin and gives a control command via the control bus (i.e., the control bus 1354). Then, in step S1409, the memory management circuit 1302 only uses the corresponding data input/output bus to transmit the data to be written.

If in step S1403, it is determined that the operation of copying valid data between the physical blocks of the corresponding memory unit is needed to execute first, in step S1411, the memory management circuit 1302 determines whether the operation of copying valid data between the physical blocks of another memory unit is needed to execute.

If the operation of copying valid data between the physical blocks of another memory unit is needed to execute, in step S1413, the memory management circuit 1302 loads the logical part-physical block mapping table and related management variables corresponding to another memory unit. After that, in step S1415, the memory management circuit 1302 respectively gives chip enable commands via different chip enable pins to enable the memory units that are needed to operate with the operation of copying valid data. After that, in step S1417, the memory management circuit 1302 gives the same control command via the control bus (i.e., the control bus 1354) to simultaneously execute the operations of copying valid data in the memory units (i.e., the first memory unit 302 and the second memory unit 312), and then the step S1407 is executed.

If the operation of copying valid data between the physical blocks of another memory unit is not needed to execute, in step S1419, the memory management circuit 1302 gives a chip enable command via the corresponding chip enable pin to enable the memory unit corresponding to this write command. And, in step S1421, the memory management circuit 1302 gives a control command via the control bus (i.e., the control bus 1354) to execute the operation of copying valid data in the corresponding memory unit, and then the step S1407 is executed.

[Third Embodiment]

A memory storage apparatus and a host system of the third exemplary embodiment substantially is the same as the memory storage apparatus and the host system of the first exemplary embodiment, and only the difference is described as the following.

Figure 15:
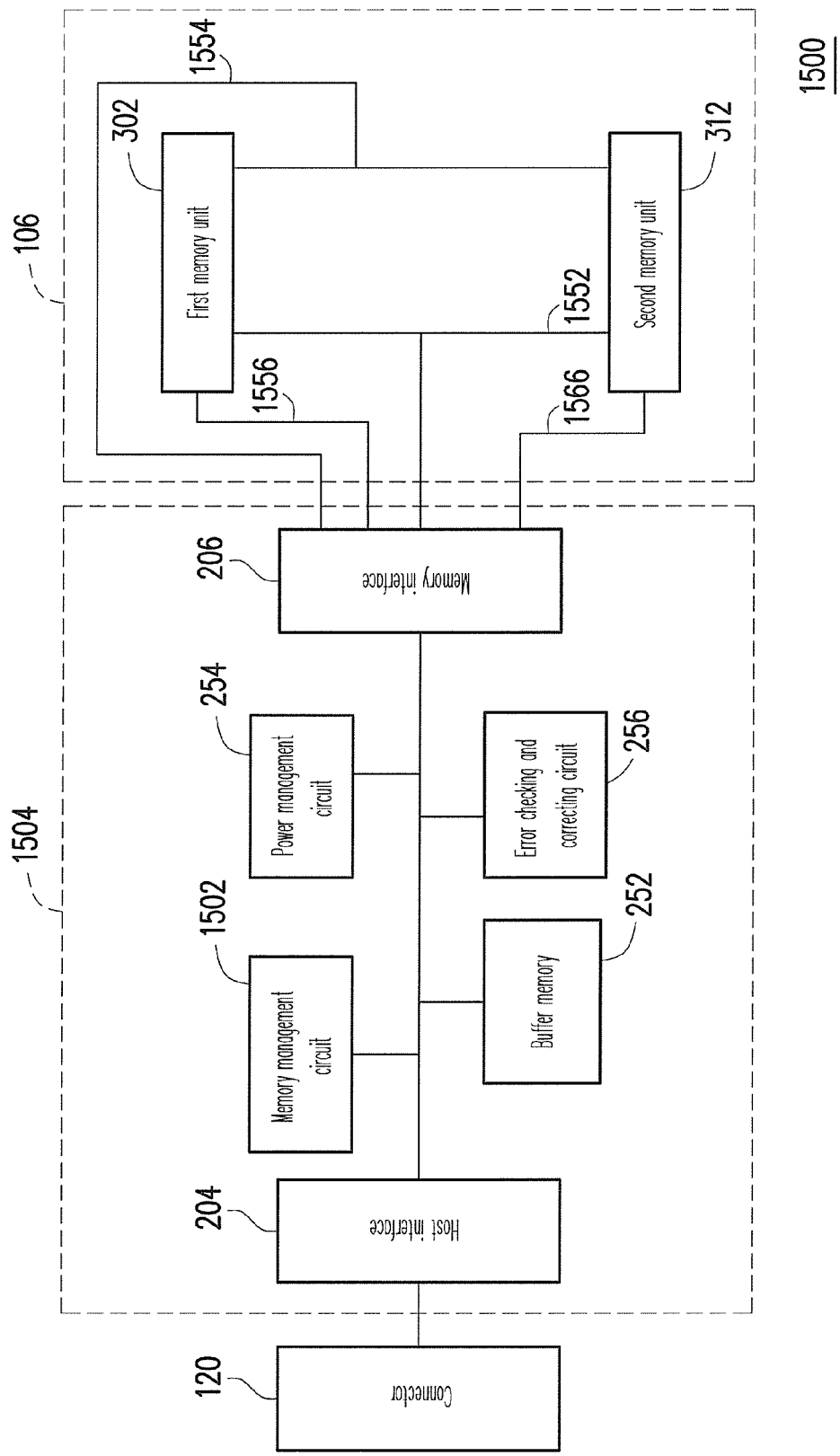
FIG. 15 is a schematic block diagram illustrating a memory storage apparatus according to a third exemplary embodiment of the present invention.

FIG. 15 is a schematic block diagram illustrating a memory storage apparatus according to the third exemplary embodiment of the present invention.

Referring to FIG. 15, the memory storage apparatus 1500 includes the connector 102, a memory controller 1504 and the memory module 106.

The memory controller 1504 executes a plurality of logic gates or control instructions implemented in a hardware form or a firmware form and performs various data operations such as data writing, reading, and erasing in the memory module 106 according to commands of the host system 1000. In particular, the memory controller 1504 executes a data access mechanism and a memory management mechanism according to the present exemplary embodiment.

The memory controller 1504 includes a memory management circuit 1502, the host interface 204, the memory interface 206, the buffer memory 252, the power management circuit 254 and the error checking and correcting circuit 256.

In the present exemplary embodiment, the first memory unit 302 of the memory module 106 is coupled to the memory interface 206 via a chip enable pin 1552, a control bus 1554 and a first data input/output bus 1556. Additionally, the second memory unit 312 of the memory module 106 is coupled to the memory interface 206 via the chip enable pin 1552, the control bus 1554 and a second data input/output bus 1566.

The memory management circuit 1502 is configured for controlling the whole operation of the memory controller 1504. To be specific, the memory management circuit 1502 has a plurality of control instructions, and the control instructions are executed to manage the memory module 106 according to the data access mechanism and the memory management mechanism of the present exemplary embodiment during the memory storage apparatus 1500 is operated.

In the present exemplary embodiment, the memory management circuit 1502 executes the operations shown in FIGS. 4~10, FIG. 11A and FIG. 11B to manage the memory module 106. However, because the coupling mechanism between the memory module 106 and the memory controller 1504 is different from that of the first exemplary embodiment, the memory management circuit 1502 gives commands in different manners to complete the operations shown in FIGS. 4~10, FIG. 11A and FIG. 11B.

For example, in the operation shown in FIGS. 8~10, the memory management circuit 1502 also only enables the first input/output bus 1556 to transmit data and complete writing data and copying valid data for the physical blocks belonging to the first memory unit 302. However, the memory management circuit 1502 first gives a chip enable command to enable the first memory unit 302 via the first chip enable pin 1552. At this time, this chip enable command also enables the second memory unit 312. Then, the memory management circuit 1502 gives a control command via the control bus 1554. At this time, this control command is also transmitted to the second memory unit 312. After that, the memory management circuit 1502 transmits data via the first input/output bus 1556 to complete the write command for the physical blocks of the first memory unit 302, and the memory management circuit 1502 transmits null data via the second input/output bus 1566 to execute a null writing operation in the second memory unit 312. In this exemplary embodiment, the null data may be a data stream in which all bits are "1" or a data pattern that be identified as meaningless data by the memory management circuit 1502.

Additionally, when the above-mentioned synchronous operation is executed, first, the memory management circuit 1502 gives a chip enable command via the chip enable pin 1552 to simultaneously enable the first memory unit 302 and the second memory unit 312. After that, the memory management circuit 1502 gives the same control command to the first memory unit 302 and the second memory unit 312 via the control bus 1554. Then, the operations of copying valid data are executed in the first memory unit 302 and the second memory unit 312, simultaneously. For example, during the operations of copying valid data are executed, valid data belonging to the first memory unit 302 and valid data belonging to the second memory unit 312 are transmitted respectively to the buffer memory 252 via the first input/output bus 1556 and the second input/output bus 1566 and then written into the corresponding physical pages.

Figure 16:
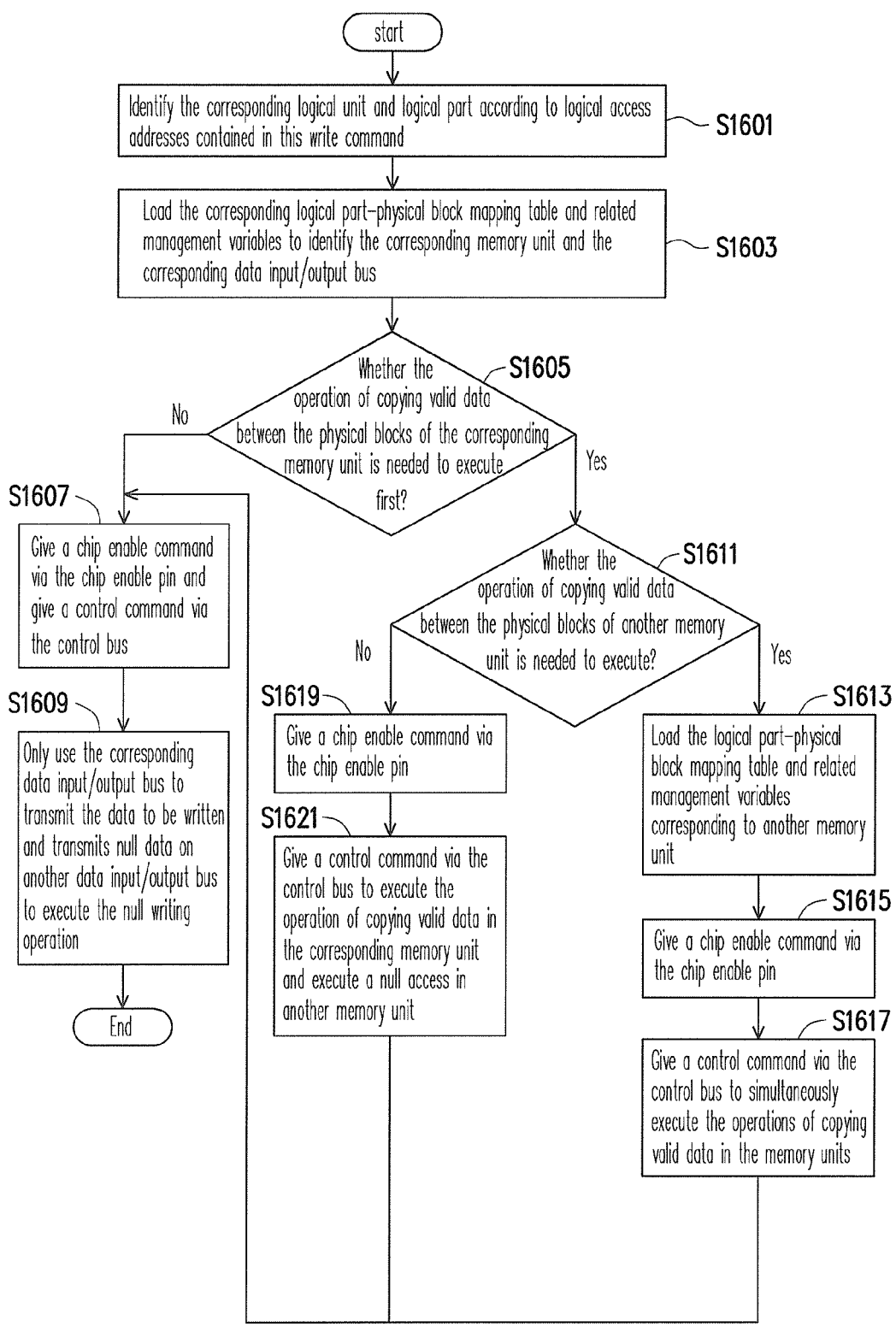
FIG. 16 is a flow chart illustrating a memory management and writing method according to the third exemplary embodiment of the present invention.

FIG. 16 is a flow chart illustrating a memory management and writing method according to the third exemplary embodiment of the present invention.

Referring to FIG. 16, when receiving a write command and data corresponding to the write command from the host system 1000, in step S1601, the memory management circuit 1502 identifies the corresponding logical unit and logical part according to logical access addresses contained in this write command. And, in step S1603, the memory management circuit 1502 loads the corresponding logical part-physical block mapping table and related management variables to identify the corresponding memory unit and the corresponding data input/output bus.

After that, in step S1605, the memory management circuit 1502 determines whether the operation of copying valid data between the physical blocks of the corresponding memory unit is needed to execute first. If the operation of copying valid data between the physical blocks of the corresponding memory unit is not needed to execute first, in step S1607, the memory management circuit 1502 gives a chip enable command via the chip enable pin (i.e., the chip enable pin 1552) and gives a control command via the control bus (i.e., the control bus 1554). Then, in step S1609, the memory management circuit 1502 only uses the corresponding data input/output bus to transmit the data to be written and transmits null data on another data input/output bus to execute the null writing operation.

If in step S1603, it is determined that the operation of copying valid data between the physical blocks of the corresponding memory unit is needed to execute first, in step S1611, the memory management circuit 1502 determines whether the operation of copying valid data between the physical blocks of another memory unit is needed to execute.

If the operation of copying valid data between the physical blocks of another memory unit is needed to execute, in step S1613, the memory management circuit 1502 loads the logical part-physical block mapping table and related management variables corresponding to another memory unit. Then, in the step S1615, the memory management circuit 1502 gives a chip enable command via the chip enable pin (i.e., the chip enable pin 1552). After that, in step S1617, the memory management circuit 1502 gives a control command via the control bus (i.e., the control bus 1554) to simultaneously execute the operations of copying valid data in the memory units (i.e., the first memory unit 302 and the second memory unit 312), and then the step S1607 is executed.

If the operation of copying valid data between the physical blocks of another memory unit is not needed to execute, in step S1619, the memory management circuit 1502 gives a chip enable command via the chip enable pin (i.e., the chip enable pin 1552). And, in step S1621, the memory management circuit 1502 gives a control command via the control bus (i.e., the control bus 1554) to execute the operation of copying valid data in the corresponding memory unit and execute a null access in another memory unit, and then the step S1607 is executed.

[Fourth Exemplary Embodiment]

A memory storage apparatus and a host system of the fourth exemplary embodiment substantially is the same as the memory storage apparatus and the host system of the first exemplary embodiment, and only the difference is described as the following.

Figure 17:
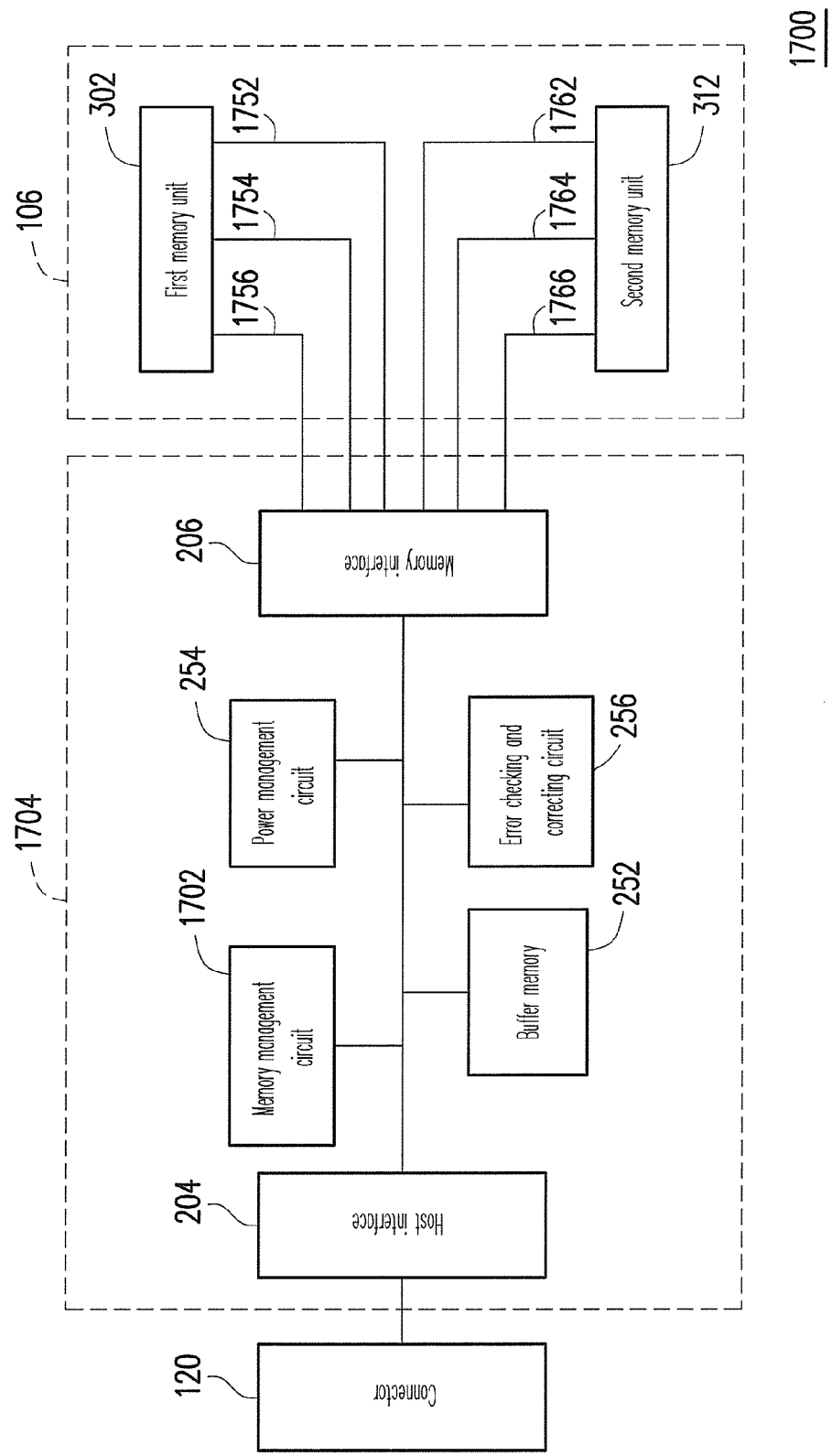
FIG. 17 is a schematic block diagram illustrating a memory storage apparatus according to a fourth exemplary embodiment of the present invention.

FIG. 17 is a schematic block diagram illustrating a memory storage apparatus according to the fourth exemplary embodiment of the present invention.

Referring to FIG. 17, the memory storage apparatus 1700 includes the connector 102, a memory controller 1704 and the memory module 106.

The memory controller 1704 executes a plurality of logic gates or control instructions implemented in a hardware form or a firmware form and performs various data operations such as data writing, reading, and erasing in the memory module 106 according to commands of the host system 1000. In particular, the memory controller 1704 executes a data access mechanism and a memory management mechanism according to the present exemplary embodiment.

The memory controller 1704 includes a memory management circuit 1702, the host interface 204, the memory interface 206, the buffer memory 252, the power management circuit 254 and the error checking and correcting circuit 256.

In the present exemplary embodiment, the first memory unit 302 of the memory module 106 is coupled to the memory interface 206 via a first chip enable pin 1752, a first control bus 1754 and a first data input/output bus 1756. Additionally, the second memory unit 312 of the memory module 106 is coupled to the memory interface 206 via a second chip enable pin 1762, a second control bus 1764 and a second data input/output bus 1766.

The memory management circuit 1702 is configured for controlling the whole operation of the memory controller 1704. To be specific, the memory management circuit 1702 has a plurality of control instructions, and the control instructions are executed to manage the memory module 106 according to the data access mechanism and the memory management mechanism of the present exemplary embodiment during the memory storage apparatus 1700 is operated.

In the present exemplary embodiment, the memory management circuit 1702 executes the operations shown in FIGS. 4~10, FIG. 11A and FIG. 11B to manage the memory module 106. However, because the coupling mechanism between the memory module 106 and the memory controller 1704 is different from that of the first exemplary embodiment, the memory management circuit 1702 gives commands in different manners to complete the operations shown in FIGS. 4~10, FIG. 11A and FIG. 11B.

For example, in the operation shown in FIGS. 8~10, the memory management circuit 1702 also only enables the first input/output bus 1756 to transmit data and complete writing data and copying valid data for the physical blocks belonging to the first memory unit 302. However, the memory management circuit 1702 first gives a first chip enable command to enable the first memory unit 302 via the first chip enable pin 1752. Then, the memory management circuit 1702 gives a first control command via the first control bus 1754. At this time, the memory management circuit 1702 transmits data only via the first input/output bus 1756 to complete the write command for the physical blocks of the first memory unit 302.

Additionally, when the above-mentioned synchronous operation is executed, the memory management circuit 1702 first gives a first chip enable command via the first chip enable pin 1752 and gives a second chip enable command via the second chip enable pin 1762. Then, the memory management circuit 1702 gives a first control command to the first memory unit 302 via the first control bus 1754 and gives a second control command to the second memory unit 312 via the second control bus 1764. Then, the operations of copying valid data are executed in the first memory unit 302 and the second memory unit 312, simultaneously. For example, during the operations of copying valid data are executed, valid data belonging to the first memory unit 302 and valid data belonging to the second memory unit 312 are transmitted respectively to the buffer memory 252 via the first input/output bus 1756 and the second input/output bus 1766 and then written into the corresponding physical pages.

Figure 18:
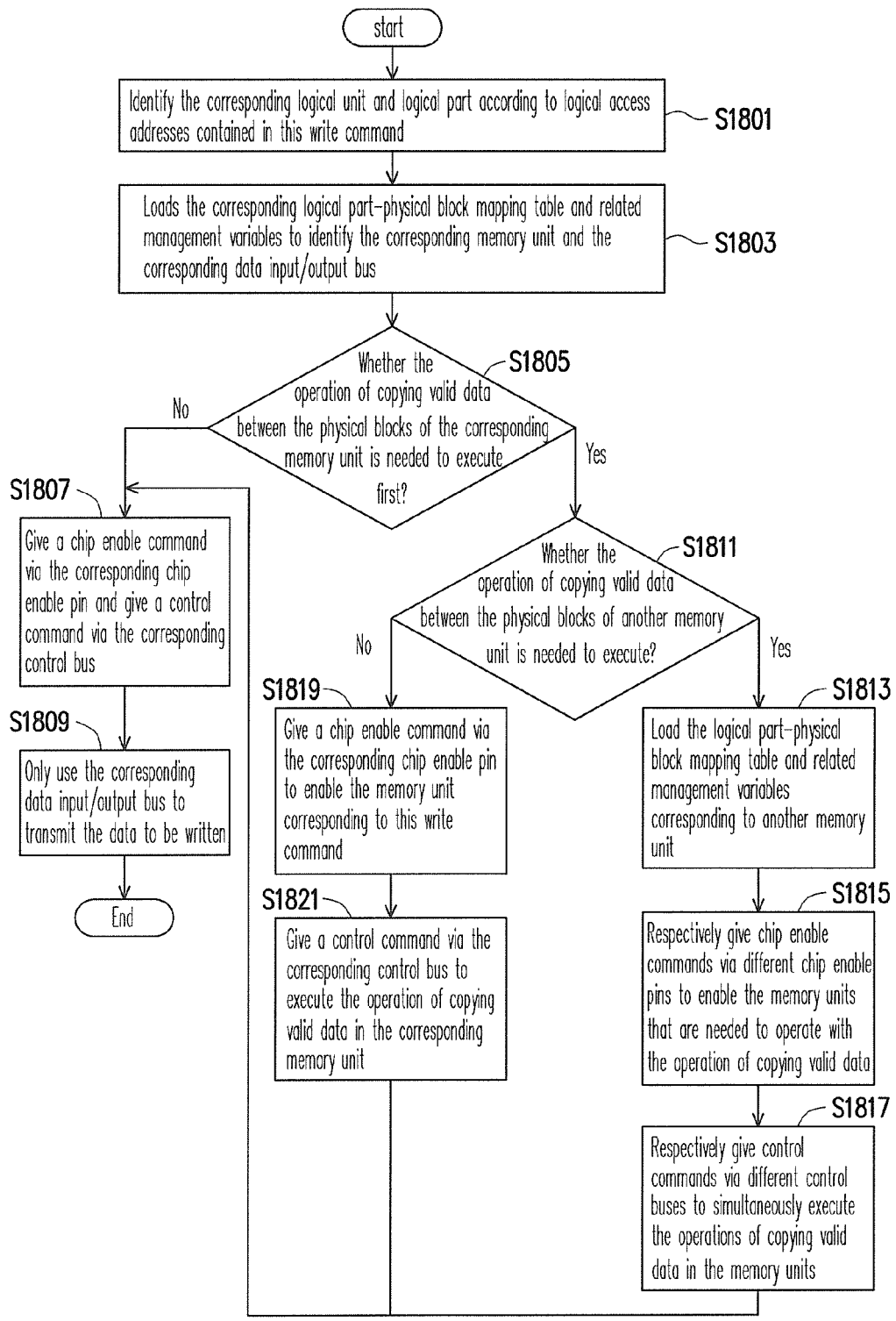
FIG. 18 is a flow chart illustrating a memory management and writing method according to the fourth exemplary embodiment of the present invention.

FIG. 18 is a flow chart illustrating a memory management and writing method according to the fourth exemplary embodiment of the present invention.

Referring to FIG. 18, when receiving a write command and data corresponding to the write command from the host system 1000, in step S1801, the memory management circuit 1702 identifies the corresponding logical unit and logical part according to logical access addresses contained in this write command. And, in step S1803, the memory management circuit 1702 loads the corresponding logical part-physical block mapping table and related management variables to identify the corresponding memory unit and the corresponding data input/output bus.

After that, in step S1805, the memory management circuit 1702 determines whether the operation of copying valid data between the physical blocks of the corresponding memory unit is needed to execute first. If the operation of copying valid data between the physical blocks of the corresponding memory unit is not needed to execute first, in step S1807, the memory management circuit 1702 gives a chip enable command via the corresponding chip enable pin and gives a control command via the corresponding control bus. Then, in step S1809, the memory management circuit 1702 only uses the corresponding data input/output bus to transmit the data to be written.

If in step S1803, it is determined that the operation of copying valid data between the physical blocks of the corresponding memory unit is needed to execute first, in step S1811, the memory management circuit 1702 determines whether the operation of copying valid data between the physical blocks of another memory unit is needed to execute.

If the operation of copying valid data between the physical blocks of another memory unit is needed to execute, in step S1813, the memory management circuit 1702 loads the logical part-physical block mapping table and related management variables corresponding to another memory unit. After that, in step S1815, the memory management circuit 1702 respectively gives chip enable commands via different chip enable pins to enable the memory units that are needed to operate with the operation of copying valid data. After that, in step S1817, the memory management circuit 1702 respectively gives control commands via different control buses to simultaneously execute the operations of copying valid data in the memory units (i.e., the first memory unit 302 and the second memory unit 312), and then the step S1807 is executed.

If the operation of copying valid data between the physical blocks of another memory unit is not needed to execute, in step S1819, the memory management circuit 1702 gives a chip enable command via the corresponding chip enable pin to enable the memory unit corresponding to this write command. And, in step S1821, the memory management circuit 1702 gives a control command via the corresponding control bus to execute the operation of copying valid data in the corresponding memory unit, and then the step S1807 is executed.

In summary, in the above-mentioned exemplary embodiments, the physical blocks are managed based on the data input/output buses and mapping tables and variables thereof are configured for the data input/output buses, respectively. Therefore, several physical blocks mapped to the same logical unit may be operated individually, thereby shortening the time for executing the above-mentioned operation of copying valid data and enhancing the performance of a storage apparatus. Additionally, the number of times for executing the above-mentioned operation of copying valid data is reduced, thereby prolonging the lifespan of the storage apparatus. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A memory management and writing method, for managing a memory module, wherein the memory module includes a first memory unit, a first data input/output bus for the first memory unit, a second memory unit and a second data input/output bus for the second memory unit, and wherein the first memory unit and the second memory unit have a plurality of physical blocks, the memory management and writing method comprising:

configuring a plurality of logical units, and dividing each of the logical units into a first logical part corresponding to the first data input/output bus and a second logical part corresponding to the second data input/output bus;

mapping the logical units to at least a portion of the physical blocks of the first memory unit and the second memory unit, wherein the first logical part of each of the logical units maps to one of the physical blocks of the first memory unit and the second logical part of each of the logical units maps to one of the physical blocks of the second memory unit;

establishing a first mapping table corresponding to the first input/output bus to record a first mapping relationship between the first logical parts of the logical blocks and the physical blocks of the first memory unit;

establishing a second mapping table corresponding to the second input/output bus to record a second mapping relationship between the second logical parts of the logical blocks and the physical blocks of the second memory unit;

receiving a write command and data corresponding to the write command, wherein the data is written into one of the first logical parts of the logical units; and only using the first input/output bus to write the data corresponding to the write command into the first memory unit based on the first mapping table.

2. The memory management and writing method according to claim 1, wherein the step of only using the first input/output bus to write the data corresponding to the write command into the first memory unit based on the first mapping table comprises:

giving a chip enable command, wherein the chip enable command simultaneously enables the first memory unit and the second memory unit;

giving a first control command to the first memory unit; and writing the data corresponding to the write command into the first memory unit via the first input/output bus based on the first mapping table.

3. The memory management and writing method according to claim 1, further comprising:

determining whether an operation of copying valid data between the physical blocks of the first memory unit is needed to execute;

determining whether an operation of copying valid data between the physical blocks of the second memory unit is needed to execute when the operation of copying valid data between the physical blocks of the first memory unit is needed to execute; and executing a synchronous operation procedure when the operation of copying valid data between the physical blocks of the second memory unit is needed to execute, wherein the synchronous operation procedure comprises:

giving a chip enable command, wherein the chip enable command simultaneously enables the first memory unit and the second memory unit;

giving a first control command to the first memory unit based on the first mapping table to copy the valid data between the physical blocks of the first memory unit; and giving a second control command to the second memory unit based on the second mapping table to copy the valid data between the physical blocks of the second memory unit.

4. The memory management and writing method according to claim 3, further comprising:

when the operation of copying valid data between the physical blocks of the second memory unit is not needed to execute, giving the chip enable command and giving the first control command to the first memory unit based on the first mapping table to copy the valid data between the physical blocks of the first memory unit.

5. The memory management and writing method according to claim 1, wherein the step of only using the first input/output bus to write the data corresponding to the write command into the first memory unit based on the first mapping table comprises:

giving a first chip enable command to the first memory unit;

giving a control command, wherein the control command is transmitted simultaneously to the first memory unit and the second memory unit; and writing the data corresponding to the write command into the first memory unit via the first input/output bus based on the first mapping table.

6. The memory management and writing method according to claim 1, further comprising:

determining whether an operation of copying valid data between the physical blocks of the first memory unit is needed to execute;

determining whether an operation of copying valid data between the physical blocks of the second memory unit is needed to execute when the operation of copying valid data between the physical blocks of the first memory unit is needed to execute; and executing a synchronous operation procedure when the operation of copying valid data between the physical blocks of the second memory unit is needed to execute, wherein the synchronous operation procedure comprises:

giving a first chip enable command to the first memory unit;

giving a second chip enable command to the second memory unit; and giving a control command based on the first mapping table and the second mapping table to copy the valid data between the physical blocks of the first memory unit and copy the valid data between the physical blocks of the second memory unit, wherein the control command is transmitted simultaneously to the first memory unit and the second memory unit.

7. The memory management and writing method according to claim 6, further comprising:

when the operation of copying valid data between the physical blocks of the second memory unit is not needed to execute, giving the first chip enable command to the first memory unit and giving the control command to the first memory unit based on the first mapping table to copy the valid data between the physical blocks of the first memory unit.

8. The memory management and writing method according to claim 1, wherein the step of only using the first input/output bus to write the data corresponding to the write command into the first memory unit based on the first mapping table comprises:

giving a chip enable command, wherein the chip enable command simultaneously enables the first memory unit and the second memory unit;

giving a control command, wherein the control command is transmitted simultaneously to the first memory unit and the second memory unit; and writing the data corresponding to the write command into the first memory unit via the first input/output bus based on the first mapping table and transmitting null data to the second memory unit to execute a null writing operation.

9. The memory management and writing method according to claim 1, further comprising:

determining whether an operation of copying valid data between the physical blocks of the first memory unit is needed to execute;

determining whether an operation of copying valid data between the physical blocks of the second memory unit is needed to execute when the operation of copying valid data between the physical blocks of the first memory unit is needed to execute; and executing a synchronous operation procedure when the operation of copying valid data between the physical blocks of the second memory unit is needed to execute, wherein the synchronous operation procedure comprises:

giving a chip enable command, wherein the chip enable command simultaneously enables the first memory unit and the second memory unit;

giving a control command based on the first mapping table and the second mapping table to copy the valid data between the physical blocks of the first memory unit and copy the valid data between the physical blocks of the second memory unit, wherein the control command is transmitted simultaneously to the first memory unit and the second memory unit.

10. The memory management and writing method according to claim 9, further comprising:

when the operation of copying valid data between the physical blocks of the second memory unit is not needed to execute, giving the chip enable command and giving the control command based on the first mapping table to copy the valid data between the physical blocks of the first memory unit and execute a null access in the second memory unit.

11. The memory management and writing method according to claim 1, wherein the step of only using the first input/output bus to write the data corresponding to the write command into the first memory unit based on the first mapping table comprises:

giving a first chip enable command to the first memory unit;

giving a first control command to the first memory unit; and writing the data corresponding to the write command into the first memory unit via the first input/output bus based on the first mapping table.

12. The memory management and writing method according to claim 1, further comprising:

determining whether an operation of copying valid data between the physical blocks of the first memory unit is needed to execute;

determining whether an operation of copying valid data between the physical blocks of the second memory unit is needed to execute when the operation of copying valid data between the physical blocks of the first memory unit is needed to execute; and executing a synchronous operation procedure when the operation of copying valid data between the physical blocks of the second memory unit is needed to execute, wherein the synchronous operation procedure comprises:

giving a first chip enable command to the first memory unit;

giving a second chip enable command to the second memory unit;

giving a first control command to the first memory unit based on the first mapping table to copy the valid data between the physical blocks of the first memory unit; and giving a second control command to the second memory unit based on the second mapping table to copy the valid data between the physical blocks of the second memory unit.

13. The memory management and writing method according to claim 12, further comprising:

when the operation of copying valid data between the physical blocks of the second memory unit is not needed to execute, giving the first chip enable command to the first memory unit and giving the first control command to the first memory unit based on the first mapping table to copy the valid data between the physical blocks of the first memory unit.

14. A memory storage system, comprising:

a connector;

a memory module, including a first memory unit, a first data input/output bus for the first memory unit, a second memory unit and a second data input/output bus for the second memory unit, and the first memory unit and the second memory unit have a plurality of physical blocks, wherein each of physical blocks has a plurality of physical pages, each of the physical pages is programmable separately and the physical pages belonging to the same physical block are erasable together; and a memory controller, coupled to the memory module and configured to:

configure a plurality of logical units, and divide each of the logical units into a first logical part corresponding to the first data input/output bus and a second logical part corresponding to the second data input/output bus;

map the logical units to at least a portion of the physical blocks of the first memory unit and the second memory unit, wherein the first logical part of each of the logical units maps to one of the physical blocks of the first memory unit and the second logical part of each of the logical units maps to one of the physical blocks of the second memory unit;

establish a first mapping table corresponding to the first input/output bus to record a first mapping relationship between the first logical parts of the logical blocks and the physical blocks of the first memory unit;

establish a second mapping table corresponding to the second input/output bus to record a second mapping relationship between the second logical parts of the logical blocks and the physical blocks of the second memory unit;

receive a write command and data corresponding to the write command, wherein the data is written into one of the first logical parts of the logical units; and only use the first input/output bus to write the data corresponding to the write command into the first memory unit based on the first mapping table.

15. The memory storage system according to claim 14, wherein the memory controller couples to the first memory unit and the second memory unit via a chip enable pin, couples to the first memory unit via a first control bus and couples to the second memory unit via a second control bus, wherein the memory controller is further configured to give a chip enable command via the chip enable pin, wherein the chip enable command simultaneously enables the first memory unit and the second memory unit, and the memory controller is further configured to give a first control command to the first memory unit via the first control bus.

16. The memory storage system according to claim 14, wherein the memory controller couples to the first memory unit and the second memory unit via a chip enable pin, couples to the first memory unit via a first control bus and couples to the second memory unit via a second control bus, wherein the memory controller is further configured to:

determine whether an operation of copying valid data between the physical blocks of the first memory unit is needed to execute;

determine whether an operation of copying valid data between the physical blocks of the second memory unit is needed to execute when the operation of copying valid data between the physical blocks of the first memory unit is needed to execute; and execute a synchronous operation procedure when the operation of copying valid data between the physical blocks of the second memory unit is needed to execute, wherein the synchronous operation procedure comprises:

giving a chip enable command via the chip enable pin, wherein the chip enable command simultaneously enables the first memory unit and the second memory unit, giving a first control command to the first memory unit via the first control bus based on the first mapping table to copy the valid data between the physical blocks of the first memory unit; and giving a second control command to the second memory unit via the second control bus based on the second mapping table to copy the valid data between the physical blocks of the second memory unit.

17. The memory storage system according to claim 16, wherein when the operation of copying valid data between the physical blocks of the second memory unit is not needed to execute, the memory controller is further configured to give the chip enable command via the chip enable pin and give the first control command to the first memory unit via the first control bus based on the first mapping table to copy the valid data between the physical blocks of the first memory unit.

18. The memory storage system according to claim 14, wherein the memory controller couples to the first memory unit via a first chip enable pin, couples to the second memory unit via a second chip enable pin, and couples to the first memory unit and the second memory unit via a control bus, wherein the memory controller is further configured to give a first chip enable command to the first memory unit via the first chip enable pin, and give a control command via the control bus, wherein the control command is transmitted simultaneously to the first memory unit and the second memory unit.

19. The memory storage system according to claim 14,
wherein the memory controller couples to the first memory unit via a first chip enable pin, couples to the second memory unit via a second chip enable pin, and couples to the first memory unit and the second memory unit via a control bus,
wherein the memory controller is further configured to:
determine whether an operation of copying valid data between the physical blocks of the first memory unit is needed to execute;
determine whether an operation of copying valid data between the physical blocks of the second memory unit is needed to execute when the operation of copying valid data between the physical blocks of the first memory unit is needed to execute; and
execute a synchronous operation procedure when the operation of copying valid data between the physical blocks of the second memory unit is needed to execute, wherein the synchronous operation procedure comprises:
giving a first chip enable command to the first memory unit via the first chip enable pin;
giving a second chip enable command to the second memory unit via the second chip enable pin; and
giving a control command via the control bus based on the first mapping table and the second mapping table to copy the valid data between the physical blocks of the first memory unit and copy the valid data between the physical blocks of the second memory unit,
wherein the control command is transmitted simultaneously to the first memory unit and the second memory unit.

20. The memory storage system according to claim 14,
wherein the memory controller couples to the first memory unit and the second memory unit via a chip enable pin, and couples to the first memory unit and the second memory unit via a control bus,
wherein the memory controller is further configured to give a chip enable command via the chip enable pin, wherein the chip enable command simultaneously enables the first memory unit and the second memory unit,
the memory controller is further configured to give a control command via the control bus, wherein the control command is transmitted simultaneously to the first memory unit and the second memory unit,
the memory controller is further configured to transmit null data to the second memory unit to execute a null writing operation.

21. The memory storage system according to claim 14,
wherein the memory controller couples to the first memory unit and the second memory unit via a chip enable pin, and couples to the first memory unit and the second memory unit via a control bus,
wherein the memory controller is further configured to:
determine whether an operation of copying valid data between the physical blocks of the first memory unit is needed to execute;
determine whether an operation of copying valid data between the physical blocks of the second memory unit is needed to execute when the operation of copying valid data between the physical blocks of the first memory unit is needed to execute; and
execute a synchronous operation procedure when the operation of copying valid data between the physical blocks of the second memory unit is needed to execute, wherein the synchronous operation procedure comprises:
giving a chip enable command via the chip enable pin, wherein the chip enable command simultaneously enables the first memory unit and the second memory unit, and
giving a control command via the control bus based on the first mapping table and the second mapping table to copy the valid data between the physical blocks of the first memory unit and copy the valid data between the physical blocks of the second memory unit, wherein the control command is transmitted simultaneously to the first memory unit and the second memory unit.

22. The memory storage system according to claim 14,
wherein the memory controller couples to the first memory unit via a first chip enable pin, couples to the second memory unit via a second chip enable pin, couples to the first memory unit via a first control bus and couples to the second memory unit via a second control bus,
wherein the memory controller is further configured to give a first chip enable command to the first memory unit via the first chip enable pin, and give a first control command via the first control bus to the first memory unit.

23. The memory storage system according to claim 14,
wherein the memory controller couples to the first memory unit via a first chip enable pin, couples to the second memory unit via a second chip enable pin, couples to the first memory unit via a first control bus and couples to the second memory unit via a second control bus,
wherein the memory controller is further configured to:
determine whether an operation of copying valid data between the physical blocks of the first memory unit is needed to execute;
determine whether an operation of copying valid data between the physical blocks of the second memory unit is needed to execute when the operation of copying valid data between the physical blocks of the first memory unit is needed to execute; and
execute a synchronous operation procedure when the operation of copying valid data between the physical blocks of the second memory unit is needed to execute, wherein the synchronous operation procedure comprises:
giving a first chip enable command to the first memory unit via the first chip enable pin;
giving a second chip enable command to the second memory unit via the second chip enable pin;
giving a first control command to the first memory unit via the first control bus based on the first mapping table to copy the valid data between the physical blocks of the first memory unit; and
giving a second control command to the second memory unit via the second control bus based on the second mapping table to copy the valid data between the physical blocks of the second memory unit.

24. A memory controller, for managing a memory module, wherein the memory module includes a first memory unit, a first data input/output bus for the first memory unit, a second memory unit and a second data input/output bus for the second memory unit, the first memory unit and the second memory unit have a plurality of physical blocks, wherein each of physical blocks has a plurality of physical pages, each of the physical pages is programmable separately and the physical pages belonging to the same physical block are erasable together, the memory controller comprising:
a host interface, configured to couple to a host system;

a memory interface, configured to couple to the memory module; and a memory management circuit, coupled to the host interface and the memory interface, and configured to:

configure a plurality of logical units, and divide each of the logical units into a first logical part corresponding to the first data input/output bus and a second logical part corresponding to the second data input/output bus;

map the logical units to at least a portion of the physical blocks of the first memory unit and the second memory unit, wherein the first logical part of each of the logical units maps to one of the physical blocks of the first memory unit and the second logical part of each of the logical units maps to one of the physical blocks of the second memory unit;

establish a first mapping table corresponding to the first input/output bus to record a first mapping relationship between the first logical parts of the logical blocks and the physical blocks of the first memory unit;

establish a second mapping table corresponding to the second input/output bus to record a second mapping relationship between the second logical parts of the logical blocks and the physical blocks of the second memory unit;

receive a write command and data corresponding to the write command, wherein the data is written into one of the first logical parts of the logical units; and only use the first input/output bus to write the data corresponding to the write command into the first memory unit based on the first mapping table.

25. The memory controller according to claim 24, wherein the memory interface couples to the first memory unit and the second memory unit via a chip enable pin, couples to the first memory unit via a first control bus and couples to the second memory unit via a second control bus, wherein the memory management circuit is further configured to give a chip enable command via the chip enable pin, wherein the chip enable command simultaneously enables the first memory unit and the second memory unit, and the memory management circuit is further configured to give a first control command to the first memory unit via the first control bus.

26. The memory controller according to claim 24, wherein the memory interface couples to the first memory unit via a first chip enable pin, couples to the second memory unit via a second chip enable pin, and couples to the first memory unit and the second memory unit via a control bus, wherein the memory management circuit is further configured to give a first chip enable command to the first memory unit via the first chip enable pin, and give a control command via the control bus, wherein the control command is transmitted simultaneously to the first memory unit and the second memory unit.

27. The memory controller according to claim 24, wherein the memory interface couples to the first memory unit and the second memory unit via a chip enable pin, and couples to the first memory unit and the second memory unit via a control bus, wherein the memory management circuit is further configured to give a chip enable command via the chip enable pin, wherein the chip enable command simultaneously enables the first memory unit and the second memory unit, the memory management circuit is further configured to give a control command via the control bus, wherein the control command is transmitted simultaneously to the first memory unit and the second memory unit, the memory management circuit is further configured to transmit null data to the second memory unit to execute a null writing operation.

28. The memory controller according to claim 24, wherein the memory interface couples to the first memory unit and the second memory unit via a chip enable pin, and couples to the first memory unit and the second memory unit via a control bus, wherein the memory management circuit is further configured to:

determine whether an operation of copying valid data between the physical blocks of the first memory unit is needed to execute;

determine whether an operation of copying valid data between the physical blocks of the second memory unit is needed to execute when the operation of copying valid data between the physical blocks of the first memory unit is needed to execute; and execute a synchronous operation procedure when the operation of copying valid data between the physical blocks of the second memory unit is needed to execute, wherein the synchronous operation procedure comprises:

giving a chip enable command via the chip enable pin, wherein the chip enable command simultaneously enables the first memory unit and the second memory unit, and giving a control command via the control bus based on the first mapping table and the second mapping table to copy the valid data between the physical blocks of the first memory unit and copy the valid data between the physical blocks of the second memory unit, wherein the control command is transmitted simultaneously to the first memory unit and the second memory unit.

29. The memory controller according to claim 24, wherein the memory interface couples to the first memory unit via a first chip enable pin, couples to the second memory unit via a second chip enable pin, couples to the first memory unit via a first control bus and couples to the second memory unit via a second control bus, wherein the memory management circuit is further configured to give a first chip enable command to the first memory unit via the first chip enable pin, and give a first control command via the first control bus to the first memory unit.

30. The memory controller according to claim 24, wherein the memory interface couples to the first memory unit via a first chip enable pin, couples to the second memory unit via a second chip enable pin, couples to the first memory unit via a first control bus and couples to the second memory unit via a second control bus, wherein the memory management circuit is further configured to:

determine whether an operation of copying valid data between the physical blocks of the first memory unit is needed to execute;

determine whether an operation of copying valid data between the physical blocks of the second memory unit is needed to execute when the operation of copying valid data between the physical blocks of the first memory unit is needed to execute; and execute a synchronous operation procedure when the operation of copying valid data between the physical blocks of the second memory unit is needed to execute, wherein the synchronous operation procedure comprises:
giving a first chip enable command to the first memory unit via the first chip enable pin;
giving a second chip enable command to the second memory unit via the second chip enable pin;
giving a first control command to the first memory unit via the first control bus based on the first mapping table to copy the valid data between the physical blocks of the first memory unit; and
giving a second control command to the second memory unit via the second control bus based on the second mapping table to copy the valid data between the physical blocks of the second memory unit.

* * * * *